US012387889B2

(12) United States Patent
Sun et al.

(10) Patent No.: US 12,387,889 B2
(45) Date of Patent: Aug. 12, 2025

(54) POWER SUPPLY SYSTEM AND SWITCH UNIT

(71) Applicant: Huawei Digital Power Technologies Co., Ltd., Shenzhen (CN)

(72) Inventors: Jisheng Sun, Shanghai (CN); Xiufeng Zhang, Dongguan (CN); Fugao Zhao, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 203 days.

(21) Appl. No.: 18/193,015

(22) Filed: Mar. 30, 2023

(65) Prior Publication Data

US 2023/0317388 A1 Oct. 5, 2023

(30) Foreign Application Priority Data

Apr. 2, 2022 (CN) ........................ 202210344335.X

(51) Int. Cl.
*H01H 33/18* (2006.01)

(52) U.S. Cl.
CPC ................................. *H01H 33/182* (2013.01)

(58) Field of Classification Search
CPC ...... H01H 33/182; H01H 33/187; H01H 1/42; H01H 1/365; H01H 9/443; H01H 9/44; H01H 9/30; H01H 19/56; H01H 19/64; H01H 19/02; H01H 19/14; H01H 1/54
USPC ............................ 218/26, 15, 22, 31, 34, 38
See application file for complete search history.

(56) References Cited

U.S. PATENT DOCUMENTS 8,946,580 B2 * 2/2015 Hoffmann .............. H01H 9/443 218/26
9,425,003 B2 * 8/2016 Mattlar .............. H01H 71/0214
9,478,373 B2 * 10/2016 Välivainio .............. H01H 1/365
10,896,789 B2 * 1/2021 Strand ...................... H01H 1/42
(Continued)

FOREIGN PATENT DOCUMENTS

CN 207250394 U 4/2018
CN 212750658 * 3/2021 ............... H01H 9/44
(Continued)

OTHER PUBLICATIONS

Translation of CN212750658 (Original document published Mar. 19, 2021) (Year: 2021).*

*Primary Examiner* — William A Bolton
(74) *Attorney, Agent, or Firm* — Maier & Maier, PLLC

(57) ABSTRACT

A power supply system includes a switch unit and an operating mechanism. The switch unit includes: an arc-extinguishing functional component, a fixed contact assembly, a moving contact, and a first magnet assembly. The arc-extinguishing functional component is located inside the arc-extinguishing functional component and can move relative to the fixed contact assembly. The operating mechanism controls the switch unit to be opened when receiving a switch-off signal, so that the moving contact is separated from the fixed contact assembly. An electric arc is formed between the moving contact and the fixed contact assembly in a separation process. Directions of at least some magnetic induction lines of the first magnet assembly intersect a current direction of the electric arc to drive the electric arc to move towards the arc-extinguishing functional component. The first magnet assembly includes a first magnet and a second magnet that are spaced apart.

20 Claims, 18 Drawing Sheets

(56) References Cited

U.S. PATENT DOCUMENTS

| | | | | |
|---|---|---|---|---|
| 11,177,082 | B2 * | 11/2021 | Rabb | H01H 1/06 |
| 2014/0091062 | A1 * | 4/2014 | Uitto | H01H 19/10<br>29/622 |
| 2014/0346144 | A1 * | 11/2014 | Coquil | H01H 1/2041<br>218/26 |
| 2023/0121284 | A1 * | 4/2023 | Zhang | H01H 19/20<br>200/336 |

FOREIGN PATENT DOCUMENTS

| | | | |
|---|---|---|---|
| CN | 213242289 | U | 5/2021 |
| CN | 114093732 | A | 2/2022 |
| WO | 2021258895 | A1 | 12/2021 |

* cited by examiner

POWER SUPPLY SYSTEM AND SWITCH UNIT

CROSS-REFERENCE TO RELATED APPLICATION

This application claims priority to Chinese Application No. 202210344335.X, filed on Apr. 2, 2022, the disclosure of which is hereby incorporated by reference in its entirety.

TECHNICAL FIELD

The embodiments relate to the field of switch technologies, a power supply system, and a switch unit.

BACKGROUND

A switch is an electronic component used to conduct or cut off a current in one or more circuits and may be for control and protection in a power system. An electric arc is generated when the switch cuts off the current. The generation of the electric arc prolongs a circuit break time, and a high temperature of the electric arc easily causes the switch to deform and melt, endangering a safe operation of the power supply system, and causing more severe casualties and property losses. In a process of using a switch, an electric arc needs to be cooled to reduce harm caused by the electric arc. However, in a conventional technology, cooling effect on the electric arc is not good, and in particular, the electric arc at a high temperature cannot be effectively cooled.

SUMMARY

The embodiments may provide a power supply system in which a switch has a good switch-off capability.

According to a first aspect, the embodiments may provide a power supply system. The power supply system includes: a control unit, a switch, a direct current source, and a power conversion unit. The switch is electrically connected between the direct current source and the power conversion unit. The control unit is configured to send a switch-off signal to the switch when the direct current source or the power conversion unit is faulty. The switch includes a switch unit and an operating mechanism. The operating mechanism is configured to receive the switch-off signal and control the switch unit to be opened or closed. The switch unit includes: an arc-extinguishing functional component, a fixed contact assembly, a moving contact, and a first magnet assembly. The fixed contact assembly is located inside the arc-extinguishing functional component. The moving contact is located inside the arc-extinguishing functional component and is configured to move relative to the fixed contact assembly. The operating mechanism controls the switch unit to be opened when receiving the switch-off signal, so that the moving contact is separated from the fixed contact assembly. An electric arc is formed between the moving contact and the fixed contact assembly in a separation process. Directions of at least some magnetic induction lines of the first magnet assembly intersect a current direction of the electric arc to drive the electric arc to move towards the arc-extinguishing functional component. The first magnet assembly includes a first magnet and a second magnet that are spaced apart. The first magnet and the second magnet are both configured to increase a movement path of the electric arc and increase a contact area between the electric arc and the arc-extinguishing functional component, thereby improving cooling effect of the arc-extinguishing functional component on the electric arc.

The first magnet and the second magnet in the first magnet assembly function together. In this way, the electric arc is subject to magnetic field forces of both the first magnet and the second magnet. The electric arc is stretched by the magnetic field forces of the two magnets, so that a bending degree of the electric arc is greater. A greater stretching degree of the electric arc indicates better cooling effect on the electric arc. In addition, two terminals of the electric arc that are close to the fixed contact assembly and the moving contact are the parts with higher temperatures in the electric arc. Two magnets, namely, the first magnet and the second magnet, are disposed. Regions with the densest magnetic induction lines in the first magnet and the second magnet are respectively distributed on sides close to the fixed contact assembly and the moving contact, so that the two terminals of the electric arc that are close to the fixed contact assembly and the moving contact are at positions with larger magnetic field forces. The electric arc is subject to a larger magnetic field force and has a longer movement path at a position with a higher temperature. This can improve cooling efficiency on the electric arc. Furthermore, the electric arc is moved to the arc-extinguishing functional component under the magnetic field force, and the electric arc is cooled for a second time by using the arc-extinguishing functional component, so that a switch-off capability of the switch is improved to a maximum extent. Further, the arc-extinguishing functional component has a simple structure and low costs.

In a possible implementation, the fixed contact assembly includes a first fixed contact and a second fixed contact that are spaced apart; the moving contact includes a first terminal and a second terminal that are disposed opposite to each other; the operating mechanism is configured to control the moving contact to rotate; when the switch unit is closed, the first terminal and the second terminal are respectively connected to the first fixed contact and the second fixed contact to conduct a current; when the switch unit is opened, the moving contact is rotated to separate the first terminal from the first fixed contact and separate the second terminal from the second fixed contact, to cut off the current and form a first electric arc between the first terminal and the first fixed contact; the first magnet and the second magnet are located on one side of the first electric arc; and the first magnet and the second magnet are both configured to increase a movement path of the first electric arc and increase a contact area between the first electric arc and the arc-extinguishing functional component.

By disposing the first fixed contact, the second fixed contact, and the first terminal and the second terminal of the moving contact, connection performance of the switch unit is better, improving a switch-on and a switch-off capability of the switch unit.

In an implementation, the fixed contact assembly is fastened relative to the arc-extinguishing functional component. The moving contact can be rotated relative to the fixed contact assembly and the arc-extinguishing functional component. The operating mechanism controls the moving contact to rotate counterclockwise to separate the moving contact from the fixed contact assembly, so that the switch changes from a closed state to an open state.

In an implementation, the arc-extinguishing functional component is of an integrated structure. The first sub-functional component and the second sub-functional component are of an integrated structure with high strength.

In an implementation, the arc-extinguishing functional component and the moving contact are of an integrated structure.

In an implementation, the first sub-functional component and the moving contact are of an integrated structure. The second sub-functional component is of an integrated structure. The first sub-functional component is connected to the second sub-functional component through welding, bonding, or the like to form the arc-extinguishing functional component.

In a possible implementation, the arc-extinguishing functional component includes at least one of an insulation enclosure or a metal grid group. The insulation enclosure is made of an insulation material, and can cool the electric arc effectively. The metal grid group includes an insulation plate and a metal plate located in the insulation plate. A metal plate in the metal grid group is not connected to the moving contact and is insulated from the moving contact. The metal plate can improve cooling effect on the electric arc.

In a possible implementation, the first magnet and the second magnet are arranged in a same direction to drive the first electric arc to move towards a same side of the arc-extinguishing functional component, increase the movement path of the first electric arc, and increase the contact area between the first electric arc and the arc-extinguishing functional component. The first magnet and the second magnet are arranged in a same direction to drive the first electric arc to move towards a same side of the arc-extinguishing functional component, increase the movement path of the first electric arc, and increase the contact area between the first electric arc and the arc-extinguishing functional component. That the first magnet and the second magnet are arranged in the same direction means that north poles and south poles of the first magnet and the second magnet are arranged in the same direction.

In an implementation, the south poles of the first magnet and the second magnet are both disposed close to the first electric arc, and the north poles of the first magnet and the second magnet are disposed far away from the first electric arc. An arrangement direction of the south poles and the north poles is coplanar with a surface of the first sub-functional component or the second sub-functional component, or an arrangement direction of the south poles and the north poles is the same as a radial direction of the first sub-functional component or the second sub-functional component.

In an implementation, the second magnet is located on a side of the first magnet along a third direction. The south poles of the first magnet and the second magnet are both disposed close to the first electric arc, and the north poles of the first magnet and the second magnet are disposed far away from the first electric arc. The first magnet and the second magnet jointly drive the first electric arc to move towards the first sub-functional component. The first electric arc is subject to the magnetic field forces of both the first magnet and the second magnet, so that the first electric arc is stretched to a greater degree. This is more conducive to cooling of the first electric arc.

In an implementation, the north poles of the first magnet and the second magnet are both disposed close to the first electric arc, and the south poles of the first magnet and the second magnet are disposed far away from the first electric arc. The second magnet is located on a side of the first magnet along the third direction. The north poles of the first magnet and the second magnet are both disposed close to the first electric arc, and the south poles of the first magnet and the second magnet are disposed far away from the first electric arc. The first magnet and the second magnet jointly drive the first electric arc to move towards the second sub-functional component. The first electric arc is subject to the magnetic field forces of both the first magnet and the second magnet, so that the first electric arc is stretched to a greater degree. This is more conducive to cooling of the electric arc.

In a possible implementation, the first magnet assembly further includes a third magnet; and the first magnet, the second magnet, and the third magnet are all arranged in a same direction to drive the first electric arc to move towards a same side of the arc-extinguishing functional component, increase the movement path of the first electric arc, and increase the contact area between the first electric arc and the arc-extinguishing functional component.

In an implementation, the first magnet, the second magnet, and the third magnet are sequentially arranged along the third direction. North poles of the first magnet, the second magnet, and the third magnet are all disposed close to the first electric arc, and south poles of the first magnet, the second magnet, and the third magnet are disposed far away from the first electric arc. The first magnet, the second magnet, and the third magnet jointly drive the first electric arc to move towards the second sub-functional component. The first electric arc is simultaneously subject to magnetic field forces of three magnets, so that the first electric arc is stretched to a greater degree. This is more conducive to cooling of the electric arc. In addition, two terminals of the first electric arc with higher temperatures are stretched to a greater degree. This is more conducive to improving cooling efficiency of the first electric arc.

In an implementation, the first magnet, the second magnet, and the third magnet are sequentially arranged along the third direction. South poles of the first magnet, the second magnet, and the third magnet are all disposed close to the first electric arc, and north poles of the first magnet, the second magnet, and the third magnet are disposed far away from the first electric arc. The first magnet, the second magnet, and the third magnet joint drive the first electric arc to move towards the first sub-functional component. The first electric arc is simultaneously subject to magnetic field forces of three magnets, so that the first electric arc is stretched to a greater degree. This is more conducive to cooling of the electric arc. In addition, two terminals of the first electric arc with higher temperatures are stretched to a greater degree. This is more conducive to improving cooling efficiency of the first electric arc.

In a possible implementation, the arc-extinguishing functional component includes a first sub-functional component and a second sub-functional component that are disposed opposite to each other, the first magnet and the second magnet are arranged in opposite directions, the first magnet is configured to drive a part of the first electric arc to move towards the first sub-functional component, the second magnet is configured to drive a part of the first electric arc to move towards the second sub-functional component, to increase the movement path of the first electric arc, the first magnet is configured to increase a contact area between the first electric arc and the first sub-functional component, and the second magnet is configured to increase a contact area between the first electric arc and the second sub-functional component, so that the first sub-functional component and the second sub-functional component are both configured to cool the first electric arc.

The first magnet and the second magnet being arranged in opposite directions means that the north poles and the south poles of the first magnet and the second magnet may be arranged in opposite directions. The south pole of the first magnet may be disposed close to the first electric arc and the north pole of the first magnet may be disposed far away from the first electric arc, and the north pole of the second magnet may be disposed close to the first electric arc and the south pole of the second magnet may be disposed far away from the first electric arc. By disposing the first magnet and the second magnet that are arranged in opposite directions, the first electric arc is approximately in an "S" shape, which prolongs the length of the first electric arc, accelerating cooling of the first electric arc. In addition, the first electric arc is cooled by fully using the first sub-functional component and the second sub-functional component, increasing an area of the arc-extinguishing functional component that can be configured to cool the first electric arc, and improving the cooling effect and efficiency of the first electric arc.

In an implementation, the first magnet and the second magnet are arranged in opposite directions. The north pole of the first magnet is disposed close to the first electric arc and the south pole of the first magnet is disposed far away from the first electric arc to drive a part of the first electric arc to move towards the second sub-functional component. The south pole of the second magnet is disposed close to the first electric arc and the north pole of the second magnet is disposed far away from the first electric arc to drive a part of the first electric arc to move towards the first sub-functional component.

In a possible implementation, the first magnet assembly further includes a third magnet; the first magnet, the second magnet, and the third magnet are sequentially arranged; the third magnet and the second magnet are arranged in opposite directions; the third magnet is configured to drive a part of the first electric arc to move towards the first sub-functional component, to increase the movement path of the first electric arc; and the third magnet is configured to increase the contact area between the first electric arc and the first sub-functional component, to improve cooling effect of the first sub-functional component on the first electric arc.

By disposing the first magnet, the second magnet, and the third magnet, the first electric arc is approximately in a "W" shape or a wave shape. In this way, the first electric arc is simultaneously subject to magnetic field forces of three magnets, prolonging the length of the first electric arc. This is more conducive to quick cooling of the first electric arc. In addition, the first electric arc is cooled by fully using the first sub-functional component and the second sub-functional component, increasing an area of the arc-extinguishing functional component that can be configured to cool the first electric arc, and improving the cooling effect and efficiency of the first electric arc. Furthermore, the first electric arc is simultaneously subject to magnetic field forces of three magnets, so that two terminals of the first electric arc with higher temperatures are stretched to a greater degree. This is more conducive to improving the cooling efficiency of the first electric arc.

In a possible implementation, the first magnet assembly further includes a third magnet; the first magnet, the second magnet, and the third magnet are sequentially arranged; the second magnet and the third magnet are arranged in a same direction; the third magnet is configured to drive a part of the first electric arc to move towards the second sub-functional component, to increase the movement path of the first electric arc; and the third magnet is configured to increase the contact area between the first electric arc and the second sub-functional component, to improve cooling effect of the second sub-functional component on the first electric arc.

The third magnet and the second magnet are arranged in a same direction, and the third magnet and the first magnet are arranged in opposite directions. The south pole of the first magnet may be disposed close to the first electric arc, and the north pole of the first magnet may be disposed far away from the first electric arc; the north poles of the second magnet and the third magnet may be disposed close to the first electric arc, and the south poles of the second magnet and the third magnet may be disposed far away from the first electric arc. By disposing the first magnet, the second magnet, and the third magnet, the first electric arc is approximately in an "S" shape. In this way, the first electric arc is simultaneously subject to magnetic field forces of three magnets, prolonging the length of the first electric arc. This is more conducive to quick cooling of the first electric arc. In addition, the first electric arc is cooled by fully using the first sub-functional component and the second sub-functional component, increasing an area of the arc-extinguishing functional component that can be configured to cool the first electric arc, and improving the cooling effect and efficiency of the first electric arc. Furthermore, the first electric arc is simultaneously subject to magnetic field forces of three magnets, so that two terminals of the first electric arc with higher temperatures are stretched to a greater degree. This is more conducive to improving the cooling efficiency of the first electric arc.

In a possible implementation, the first magnet assembly further includes a third magnet; the third magnet is located between the first magnet and the second magnet; the third magnet and the first magnet are arranged in a same direction; the third magnet is configured to drive a part of the first electric arc to move towards the first sub-functional component, to increase the movement path of the first electric arc; and the third magnet is configured to increase the contact area between the first electric arc and the first sub-functional component, to improve cooling effect of the first sub-functional component on the first electric arc.

By disposing the first magnet, the second magnet, and the third magnet, the first electric arc is approximately in an "S" shape. In this way, the first electric arc is simultaneously subject to magnetic field forces of three magnets, prolonging the length of the first electric arc. This is more conducive to quick cooling of the first electric arc. In addition, the first electric arc is cooled by fully using the first sub-functional component and the second sub-functional component, increasing an area of the arc-extinguishing functional component that can be configured to cool the first electric arc, and improving the cooling effect and efficiency of the first electric arc. Furthermore, the first electric arc is simultaneously subject to magnetic field forces of three magnets, so that two terminals of the first electric arc with higher temperatures are stretched to a greater degree. This is more conducive to improving the cooling efficiency of the first electric arc.

In a possible implementation, an extension direction of the first magnet intersects an extension direction of the second magnet, so that the first magnet assembly drives the first electric arc at a larger force and a volume of the switch is reduced. The first magnet and the second magnet are disposed in close contact with the arc-extinguishing functional component and the first electric arc. In this implementation, the arc-extinguishing functional component is circular, and surfaces of the first magnet and the second magnet that are close to the arc-extinguishing functional component are both perpendicular to a radial direction of the arc-extinguishing functional component. The magnet assembly is disposed close to the first electric arc, so that a magnetic field force applied on the first electric arc is larger, and the magnet assembly can better drive the first electric arc to move. This is conducive to cooling of the first electric arc. In addition, because the magnet assembly is in close contact with the arc-extinguishing functional component and the first electric arc, a volume of the switch unit is reduced, and a volume of the switch is further reduced.

In an implementation, an extension direction of the first magnet is parallel to an extension direction of the second magnet, and the first magnet and the second magnet are on a same straight line.

In a possible implementation, an extension direction of the first magnet is the same as an extension direction of the second magnet, and a direction of a magnetic induction line inside the first magnet intersects a direction of a magnetic induction line inside the second magnet, so that the first electric arc is in close contact with the arc-extinguishing functional component. The direction of the magnetic induction line inside the first magnet is the direction from the south pole of the first magnet to the north pole of the first magnet. The direction of the magnetic induction line inside the second magnet is the direction from the south pole of the second magnet to the north pole of the second magnet. In an actual scenario, the first electric arc may be a curve, the arc-extinguishing functional component may be an uneven enclosure, and the direction of the magnetic induction line inside the first magnet is different from the direction of the magnetic induction line inside the second magnet by a preset angle. A magnetic field direction is adjusted to control a moving direction of the first electric arc, so that the first electric arc can move onto the arc-extinguishing functional component more quickly, facilitating cooling of the first electric arc.

In an implementation, the direction of the magnetic induction line inside the first magnet is parallel to the direction of the magnetic induction line inside the second magnet.

In an implementation, a thickness of the first magnet assembly in a first direction is greater than a thickness of the arc-extinguishing functional component in the first direction. In this way, the first electric arc can better move under a magnetic field force, accelerating a cooling speed of the first electric arc.

In a possible implementation, the first magnet assembly includes four or more magnets, the four or more magnets include the first magnet and the second magnet, the four or more magnets are sequentially arranged, and directions of magnetic induction lines of the magnets are sequentially different by a preset angle to improve cooling effect on the first electric arc. By adjusting a quantity of magnets, a direction of a magnetic induction line of a magnet, or a preset angle difference between directions of magnetic induction lines of neighboring magnets, the first electric arc is controlled to be in a square wave shape approximately, so that the first electric arc adapts to the shape of the arc-extinguishing functional component and moves onto the first sub-functional component and the second sub-functional component more quickly, improving cooling effect on the first electric arc.

In a possible implementation, the switch unit further includes a second magnet assembly; when the switch unit is opened, a second electric arc is formed between the second terminal and the second fixed contact; the first magnet and the second magnet are located on a side of the first electric arc far away from the second electric arc; and directions of at least some magnetic induction lines of the second magnet assembly interact a current direction of the second electric arc to drive the second electric arc to move.

The second magnet assembly further includes a fourth magnet and a fifth magnet that are spaced apart, the fourth magnet and the fifth magnet are located on a side of the second electric arc far away from the first electric arc, and the fourth magnet and the fifth magnet are both configured to increase a movement path of the second electric arc and increase a contact area between the second electric arc and the arc-extinguishing functional component, to cool the second electric arc, improve cooling effect on the second electric arc, and further improve a switch-off capability of the switch unit.

In an implementation, the second magnet assembly is the same as the first magnet assembly. For example, the first magnet, the second magnet, the fourth magnet, and the fifth magnet are all arranged in a same direction, north poles of the first magnet and the second magnet are both disposed close to the first electric arc and south poles of the first magnet and the second magnet are disposed far away from the first electric arc, and north poles of the fourth magnet and the fifth magnet are both disposed close to the second electric arc and south poles of the fourth magnet and the fifth magnet are disposed far away from the second electric arc.

In an implementation, a quantity of magnets included in the second magnet assembly may be the same as or different from a quantity of magnets included in the first magnet assembly. This is not limited herein.

In a possible implementation, the first magnet assembly and the second magnet assembly are located on two sides of the arc-extinguishing functional component along a radial direction of the arc-extinguishing functional component, the first magnet assembly is disposed close to the first fixed contact to improve cooling effect on the first electric arc, and the second magnet assembly is disposed close to the second fixed contact to improve cooling effect on the second electric arc. The first magnet assembly is located on a side of the arc-extinguishing functional component close to the first fixed contact along a second direction. The second magnet assembly is located on a side of the arc-extinguishing functional component close to the second fixed contact along the second direction. By disposing the first magnet assembly and the second magnet assembly, the first electric arc and the second electric arc that are formed when the switch unit is opened can be cooled under magnetic field forces in a manner of stretching the electric arcs and moving onto the arc-extinguishing functional component, thereby improving a switch-off capability of the switch unit, and ensuring secure operation of the power supply system.

In a possible implementation, the arc-extinguishing functional component includes the first sub-functional component and the second sub-functional component that are disposed opposite to each other, the first magnet assembly and the second magnet assembly are located on a side of the first sub-functional component far away from the second sub-functional component, the first magnet assembly is disposed close to the first fixed contact, and the second magnet assembly is disposed close to the second fixed contact to reduce a size of the switch unit. Magnetic field directions of magnets in the first magnet assembly and the second magnet assembly are the same as a radial direction of the first sub-functional component, in other words, the magnetic field directions of the magnets in the first magnet assembly and the second magnet assembly are coplanar with the first sub-functional component or the second sub-functional component.

In a possible implementation, magnetic field directions of magnets in the first magnet assembly and the second magnet assembly are perpendicular to the first sub-functional component or the second sub-functional component.

In a possible implementation, the switch includes a plurality of switch units, the first magnet assembly and the second magnet assembly are distributed between two neighboring switch units, and magnetic field directions of magnets in the first magnet assembly and the second magnet assembly are perpendicular to surfaces of the first sub-functional component and the second sub-functional component. Two switch unit share one set of first magnet assembly and second magnet assembly, so that a quantity of magnets can be reduced, thereby reducing costs.

In some implementations, magnetic field directions of magnets in the first magnet assembly and the second magnet assembly may be opposite or the same, or magnetic field directions of some magnets are opposite and magnetic field directions of some other magnets are the same. This may be set as required. A quantity of magnets in the first magnet assembly and the second magnet assembly can also be set as required.

In some implementations, magnetic field directions of magnets in the first magnet assembly and the second magnet assembly may intersect. This may be set as required.

It should be noted that the magnets in the first magnet assembly and the second magnet assembly may be permanent magnets or soft magnets, may be magnets or magnets doped with metal atoms such as cobalt and nickel, or may be other magnets that can generate magnetic fields and have magnetic induction lines.

According to a second aspect, the embodiments may provide a switch unit. The switch unit is applied to a switch. The switch includes: a knob, the switch unit, and an operating mechanism connected between the knob and the switch unit. The knob is configured to control controlling the switch unit to be opened or closed by using the operating mechanism. The switch unit includes: an arc-extinguishing functional component, a fixed contact assembly, a moving contact, and a first magnet assembly. The fixed contact assembly is located inside the arc-extinguishing functional component. The moving contact is located inside the arc-extinguishing functional component and is configured to move relative to the fixed contact assembly. The moving contact is connected to the fixed contact assembly when the switch unit is closed. The moving contact is separated from the fixed contact assembly when the switch unit is opened. An electric arc is formed between the moving contact and the fixed contact assembly in a separation process. Directions of at least some magnetic induction lines of the first magnet assembly intersect a current direction of the electric arc to drive the electric arc to move towards the arc-extinguishing functional component. The first magnet assembly includes a first magnet and a second magnet that are spaced apart. The first magnet and the second magnet are both configured to increase a movement path of the electric arc and increase a contact area between the electric arc and the arc-extinguishing functional component, improving cooling effect of the arc-extinguishing functional component on the electric arc. In the foregoing implementations, the descriptions and deformation solutions of the arc-extinguishing functional component, the fixed contact assembly, the moving contact, and the first magnet assembly in the power supply system are applicable to the arc-extinguishing functional component, the fixed contact assembly, the moving contact, and the first magnet assembly in the switch unit in this embodiment. In the foregoing embodiments, the description and the deformation solution of the position relationship between the first magnet assembly and the arc-extinguishing functional component in the power supply system are applicable to the position relationship between the first magnet assembly and the arc-extinguishing functional component in the switch unit in this embodiment. Details are not described herein again.

BRIEF DESCRIPTION OF THE DRAWINGS

To describe the embodiments more clearly, the following describes the accompanying drawings.

DETAILED DESCRIPTION OF THE EMBODIMENTS

The following describes the embodiments with reference to the accompanying drawings. Obviously, the described embodiments are merely a part rather than all of the embodiments.

The terms "first", "second", and the like are merely intended for a purpose of description and shall not be understood as an indication or implication of relative importance or implicit indication of a quantity of indicated features. Therefore, a feature limited by "first" or "second" may explicitly or implicitly include one or more features. In the descriptions, unless otherwise stated, "a plurality of" means two or more than two.

In addition, position terms such as "top" and "bottom" are defined relative to positions of structures in the accompanying drawings. It should be understood that these position terms are relative concepts used for relative description and clarification, and may correspondingly change according to changes in the positions of the structures.

For ease of understanding, the following first explains and describes English abbreviations and related terms used in the embodiments.

Left-hand rule: Stretch the left hand and make the thumb vertical to the other four fingers in the same plane, so that the magnetic induction line flows from the hand center. The four fingers point to the current direction, and the thumb points to the ampere force direction, that is, the conductor force direction.

Figure 1:
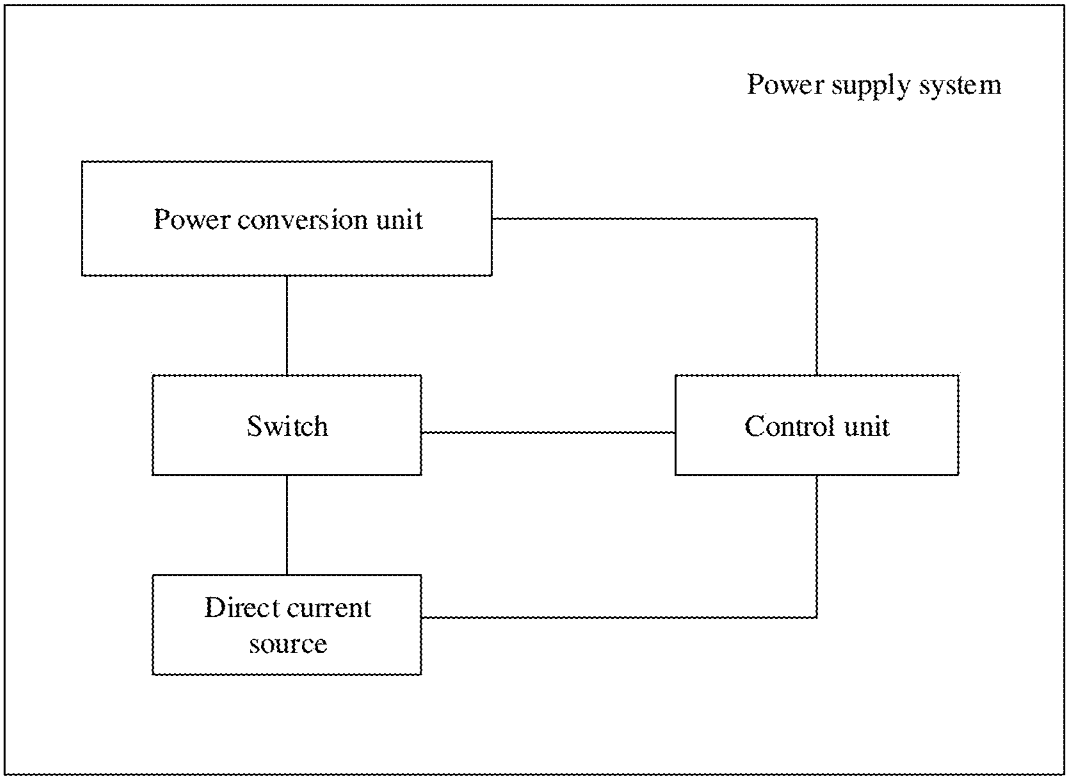
FIG. 1 is a schematic diagram of a power supply system according to an implementation.

FIG. 1 is a schematic diagram of a power supply system according to an implementation. An implementation may provide a power supply system and a switch applied to the power supply system. The power supply system includes: a control unit, a switch, a direct current source, and a power conversion unit. The switch is electrically connected between the direct current source and the power conversion unit. The control unit is configured to send a switch-off signal to the switch when the direct current source or the power conversion unit is faulty. The direct current source may be a photovoltaic module, a photovoltaic string, or a series-parallel circuit including a photovoltaic module and a photovoltaic string; or the direct current source may be a power conversion unit. The power conversion unit may be a DC/DC converter or a DC/AC converter. The direct current source and the power conversion unit each may be considered as a power supply circuit. When the power supply circuit is faulty, for example, if the control unit detects that the direct current source or the power conversion unit is faulty, the control unit can send a switch-off signal to the switch, where the switch-off signal is used to trigger (that is, drive) the switch to be opened to disconnect the circuit.

In an implementation, the control unit may be an independent controller. The controller is disposed in a power supply system and is independent of the direct current source and the power conversion unit, and is electrically connected to the power conversion unit, the direct current source, and the switch by using a signal cable. In an implementation, the power conversion unit may be an independent power conversion apparatus, for example, an inverter. In an implementation, the control unit may alternatively be integrated into another functional apparatus. For example, the control unit may be integrated into an inverter, and may be a control circuit or a control chip on a main board in the inverter. In this way, as an independent apparatus, the power conversion apparatus can have a function of free tripping in any scenario, that is, automatic tripping when a circuit fault occurs.

Figure 2:
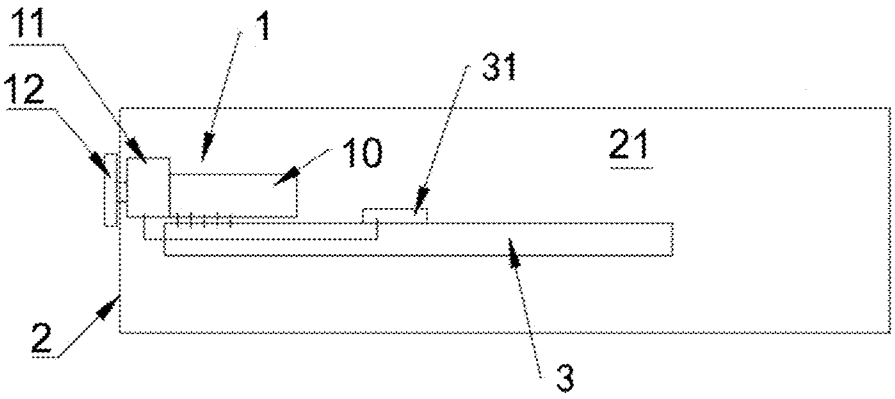
FIG. 2 is a schematic diagram of a power conversion apparatus according to an implementation.

The switch may be an independent switch device disposed in the power supply system, or the switch may be disposed on a functional apparatus in the power supply system. For example, in an implementation, the switch is disposed on the power conversion apparatus. As shown in FIG. 2, the power conversion apparatus includes: a housing 2, a switch 1, and a circuit board 3. The housing 2 is surrounded to form an accommodation space 21. The circuit board 3 is disposed in the accommodation space 21. The switch 1 includes: a knob 12, an operating mechanism 11, and a switch unit 10. The switch unit 10 and the operating mechanism 11 are located inside the accommodation space 21 and are electrically connected to the circuit board 3. The knob 12 is located on one side of an outer surface of the housing 2. In an implementation manner, a control unit 31 is disposed on the circuit board 3, the control unit 31 is electrically connected to the operating mechanism 11, and the control unit 31 is configured to send a switch-off signal to the operating mechanism 11, so that the operating mechanism 11 can drive the switch unit 10 to switch off. In an implementation, the operating mechanism 11 is of a free tripping structure.

Figure 3:
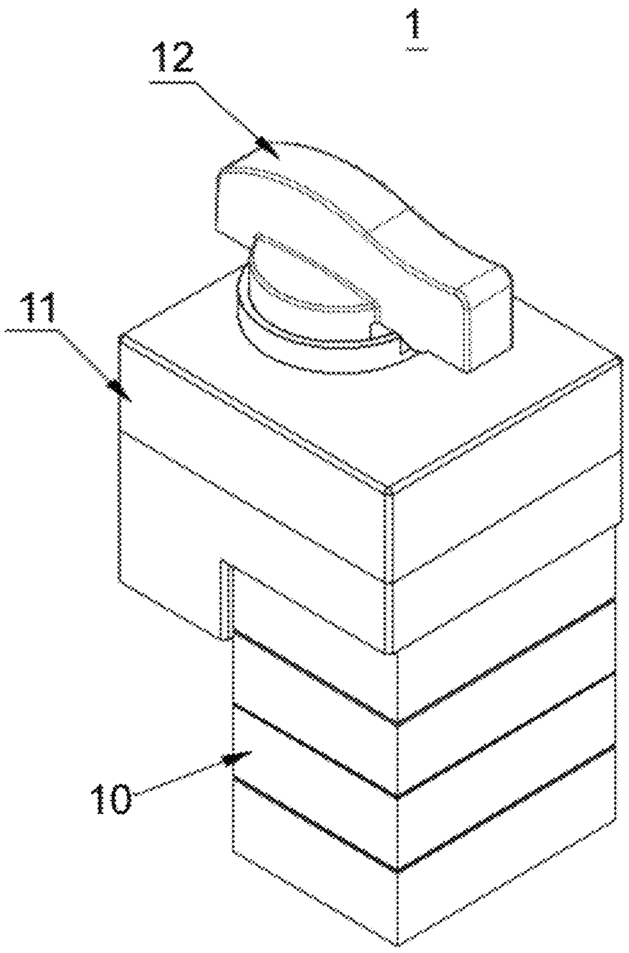
FIG. 3 is a three-dimensional diagram of a structure of a switch according to an implementation.

FIG. 3 is a three-dimensional diagram of a structure of a switch 1 according to an implementation. The switch 1 includes a switch unit 10 and an operating mechanism 11. The operating mechanism 11 is configured to receive a switch-off signal and control the switch unit 10 to be open or closed. In an implementation, the switch 1 may include a plurality of stacked switch units 10. In an implementation, the switch 1 further includes a knob 12. The knob 12 drives, by using the operating mechanism 11, the switch unit 10 to be open or closed.

Figure 4:
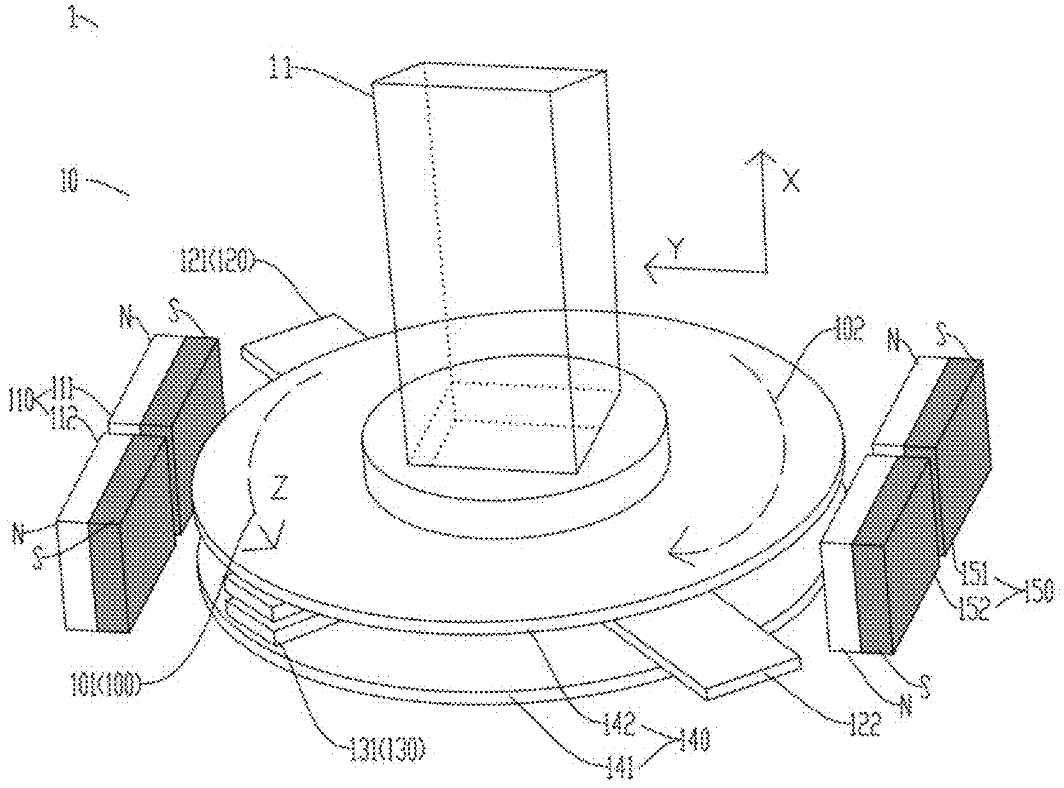
FIG. 4 is a three-dimensional diagram of a structure of a switch according to an implementation.
Figure 5A:
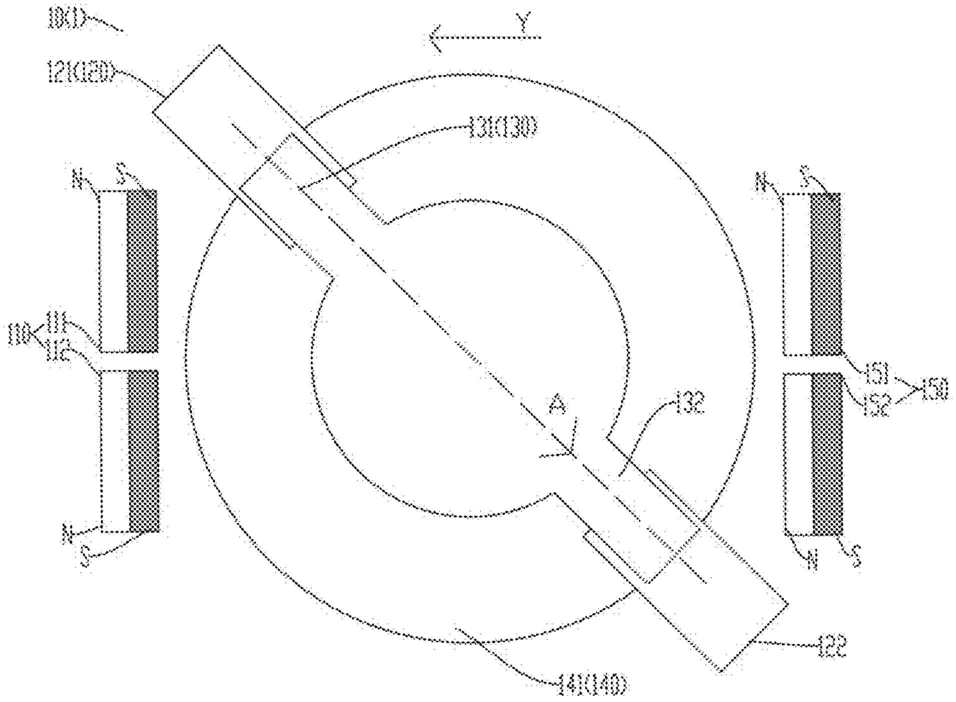
FIG. 5*a* is a cross-sectional view of a closed switch according to an implementation.
Figure 5B:
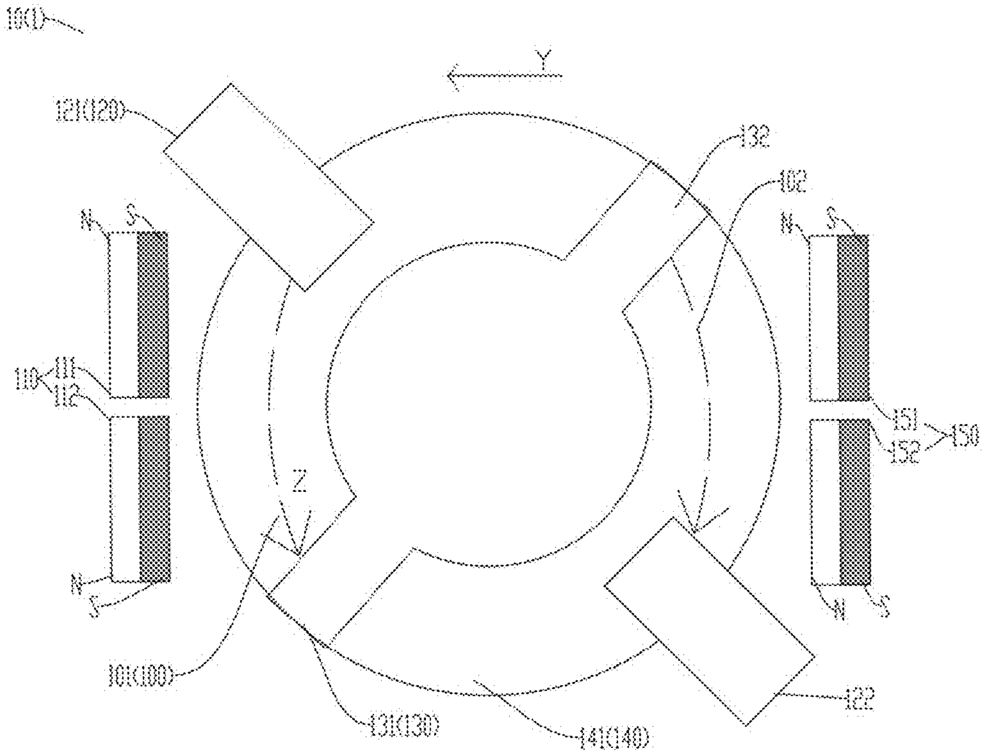
FIG. 5*b* is a cross-sectional view of an opened switch according to an implementation.

FIG. 4 is a three-dimensional diagram when a switch 1 is opened. FIG. 5*a* is a cross-sectional view when the switch 1 is closed. FIG. 5*b* is a cross-sectional view when the switch 1 in FIG. 4 is opened. The switch unit 10 includes: an arc-extinguishing functional component 140, a fixed contact assembly 120, a moving contact 130, and a first magnet assembly 110. The fixed contact assembly 120 is located inside the arc-extinguishing functional component 140. The moving contact 130 is located inside the arc-extinguishing functional component 140 and is configured to move relative to the fixed contact assembly 120. The operating mechanism 11 controls the switch unit 10 to be opened when receiving a switch-off signal, so that the moving contact 130 is separated from the fixed contact assembly 120. An electric arc 100 is formed between the moving contact 130 and the fixed contact assembly 120 in a separation process. Directions of at least some magnetic induction lines of the first magnet assembly 110 intersect a current direction of the electric arc 100 to drive the electric arc 100 to move towards the arc-extinguishing functional component 140. The first magnet assembly 110 includes a first magnet 111 and a second magnet 112 that are spaced apart. The first magnet 111 and the second magnet 112 are both configured to increase a movement path of the electric arc 100 and increase a contact area between the electric arc 100 and the arc-extinguishing functional component 140, thereby improving cooling effect of the arc-extinguishing functional component 140 on the electric arc 100.

When the switch 1 is closed, the switch unit 10 is closed. In this case, the fixed contact assembly 120 is connected to the moving contact 130, and a current between the fixed contact assembly 120 and the moving contact 130 is conducted (as shown in FIG. 5*a*). When the switch 1 is opened, the switch unit 10 is opened. In this case, the fixed contact assembly 120 is separated from the moving contact 130, and the current between the fixed contact assembly 120 and the moving contact 130 is cut off (as shown in FIG. 5*b*).

In the process in which the fixed contact assembly 120 is separated from the moving contact 130, a group of high-temperature gas, accompanied by strong light emission and strong conductivity, that is, the electric arc 100, is generated between the fixed contact assembly 120 and the moving contact 130. The electric arc 100 is electrical discharge of a gas, the electric arc 100 has light weight and a shape thereof is easily changed. Generation of the electric arc 100 prolongs a circuit disconnection time. If a circuit of the power supply system is faulty and the switch 1 needs to be opened, the generation of the electric arc 100 results in untimely switch-off of the switch 1, thereby causing severer damage to the power supply system. In addition, the high temperature of the electric arc 100 easily causes deformation and melting of the static contact assembly 120 and the moving contact 130, and even causes an accident such as explosion of the switch 1 and burning of a person. Further, strong light of the electric arc 100 may also damage eyesight of a person. Furthermore, the conductivity of the electric arc 100 easily causes a short circuit of another device, endangering safe operation of the power supply system, and causing severe casualties and property losses.

In FIG. 4 and FIG. 5*b*, the shape of the electric arc 100 is merely an example. In practice, the electric arc 100 affected by a surrounding environment may be a curve or another shape.

Both the first magnet 111 and the second magnet 112 are substances or materials that can generate magnetic fields. Both the first magnet 111 and the second magnet 112 have two polarities, namely, a magnetic north pole N and a magnetic south pole S. In this implementation, the first magnet 111 and the second magnet 112 are strip magnets. The north pole N and the south pole S of the first magnet 111 are located at two terminals of the first magnet 111. A direction of a magnetic induction line, that is, a magnetic field direction, outside the first magnet 111 is from the north pole N to the south pole S. A magnetic field direction outside the second magnet 112 is from the south pole S to the north pole N. In this implementation, the first magnet 111 and the second magnet 112 are arranged in an approximately same direction as an extension direction of the electric arc 100 to better prolong a length of the electric arc 100, thereby improving cooling effect on the electric arc 100. In an implementation, the first magnet 111 and the second magnet 112 are both permanent magnets, can maintain magnetism for a long time, and are not easily demagnetized or magnetized, so that the first magnet 111 and the second magnet 112 can function stably for a long time in the switch 1. In an implementation, the first magnet 111 and the second magnet 112 are both soft magnets; or one of the first magnet 111 and the second magnet 112 is a permanent magnet, and the other one of the first magnet 111 and the second magnet 112 is a soft magnet.

Figure 6:
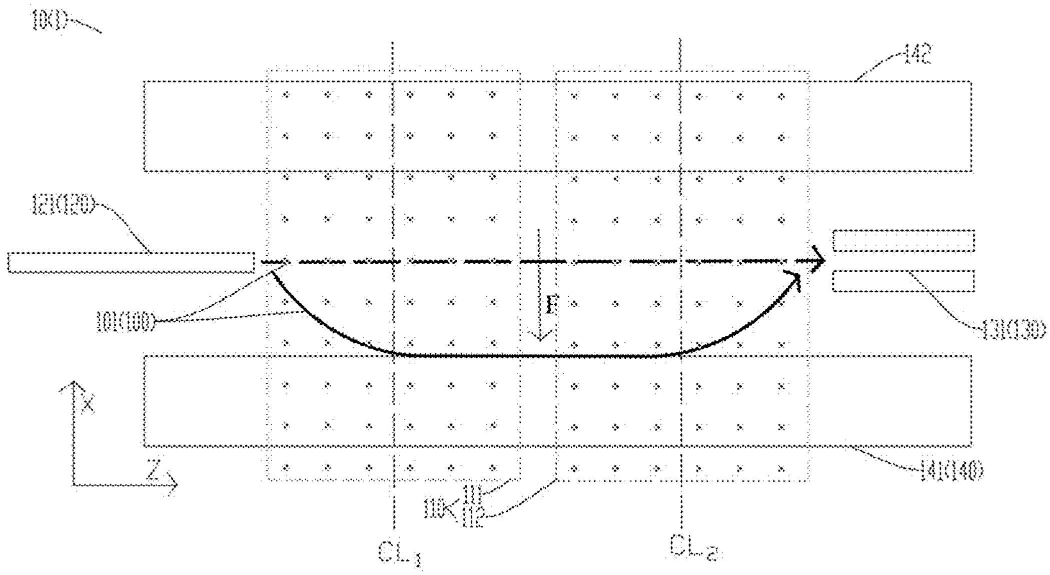
FIG. 6 is a schematic diagram illustrating that an electric arc moves under a magnetic field force according to an implementation.
Figure 13:
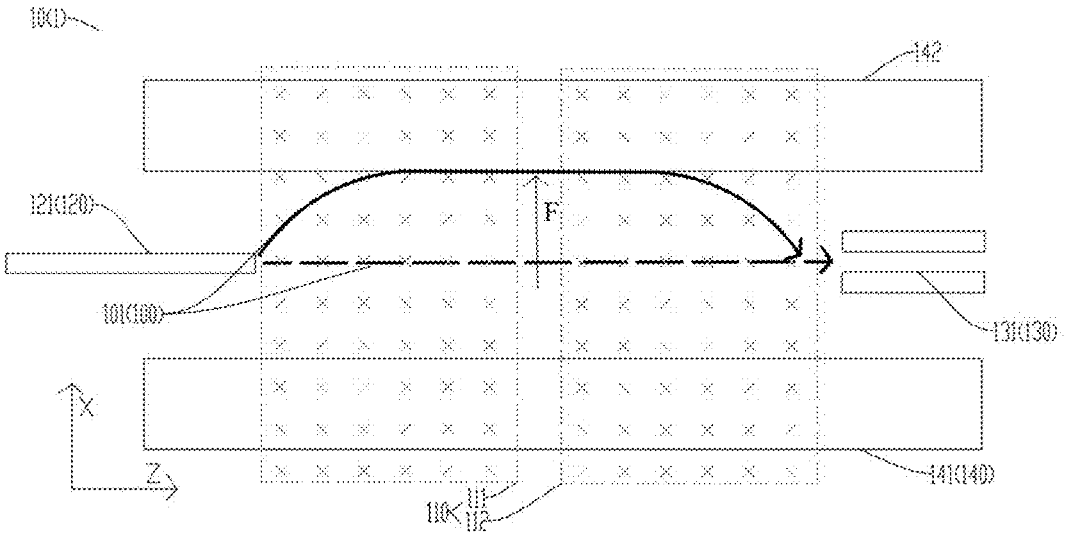
FIG. 13 is a schematic diagram illustrating that an electric arc moves under a magnetic field force according to an implementation.

Generally, a magnetic field direction may be physically represented by "x" and "·", where "x" represents a direction perpendicular to the paper facing inward (as shown in FIG. 13), and "·" represents a direction perpendicular to the paper facing outward (as shown in FIG. 6). In this implementation, "x" and " " represent only magnetic field directions, and densities of "x" and "·" do not represent a magnetic induction line density and magnetic field strength.

The electric arc 100 is located in magnetic fields of the first magnet 111 and the second magnet 112, and a current direction of the electric arc 100 intersects directions of at least some magnetic induction lines of the first magnet 111 and the second magnet 112. The electric arc 100 moves under a magnetic field force. The moving direction of the electric arc 100 may be determined according to the left-hand rule, and the direction of the magnetic field force applied to the electric arc 100 is adjusted by adjusting placement positions and polarity directions of the first magnet 111 and the second magnet 112. Further, the moving direction of the electric arc 100 is adjusted.

FIG. 6 is a schematic diagram illustrating that an electric arc 100 moves under a magnetic field force. The electric arc 100 in a form of a dashed line represents a shape of the electric arc 100 before the electric arc 100 is subject to the magnetic field force. The electric arc 100 in a form of a solid line represents a shape of the electric arc 100 after the electric arc 100 is subject to the magnetic field force. The electric arc 100 is stretched after being subject to the magnetic field force. A longer length of the electric arc 100 indicates better cooling effect.

An arc-extinguishing functional component 140 is configured to cool the electric arc 100 and isolate inner components such as a fixed contact assembly 120 and a moving contact 130 inside the arc-extinguishing functional component 140 from an external environment.

In a possible implementation, the arc-extinguishing functional component includes at least one of an insulation enclosure or a metal grid group. The insulation enclosure is made of an insulation material, and can cool the electric arc effectively. The metal grid group includes an insulation plate and a metal plate located in the insulation plate. The metal plate in the metal grid group is not connected to the moving contact, and is insulated from the moving contact by using the insulation plate. The metal plate can improve cooling effect on the electric arc.

Figure 7:
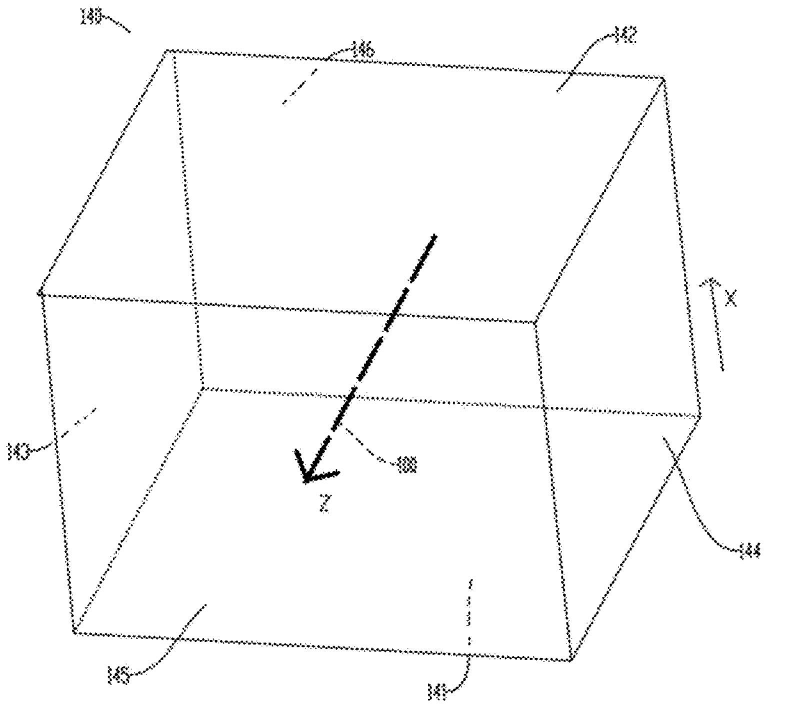
FIG. 7 is a schematic diagram of an arc-extinguishing functional component according to an implementation.

In an implementation shown in FIG. 7, an arc-extinguishing functional component 140 may be a cuboid or a cube having six side faces. When a switch 1 is opened, a current direction of an electric arc 100 is a direction from a fifth sub-functional component 145 of the arc-extinguishing functional component 140 to a sixth sub-functional component 146. By adjusting a first magnet assembly 110, the electric arc 100 can move onto the arc-extinguishing functional component 140, such as a first sub-functional component 141, a second sub-functional component 142, a third sub-functional component 143, and a fourth sub-functional component 144 in FIG. 7, around the electric arc 100, so that the electric arc 100 is cooled and extinguished and the switch 1 is completely opened, thereby improving a switch-off capability of the switch 1. When the arc-extinguishing functional component 140 is an insulation enclosure, the first sub-functional component 141, the second sub-functional component 142, the third sub-functional component 143, the fourth sub-functional component 144, the fifth sub-functional component 145, and the sixth sub-functional component 146 are six side walls of the insulation enclosure.

In an implementation, the arc-extinguishing functional component 140 may alternatively include only the first sub-functional component 141 and the second sub-functional component 142. The first magnet assembly 110 drives the electric arc 100 onto the first sub-functional component 141 and/or the second sub-functional component 142.

In an implementation, the arc-extinguishing functional component 140 may alternatively include only the first sub-functional component 141. The first magnet assembly 110 drives the electric arc 100 onto the first sub-functional component 141.

In an implementation, the electric arc 100 may alternatively move onto another insulation component in the arc-extinguishing functional component 140. In this case, the arc-extinguishing functional component 140 may alternatively be an ordinary enclosure.

In an implementation, an inner wall of the arc-extinguishing functional component 140 has an insulation coating, so that the arc-extinguishing functional component 140 is insulated.

In an implementation, the arc-extinguishing functional component 140 may alternatively be another three-dimensional shape such as a sphere, a cylinder, or a prism.

Figure 8:
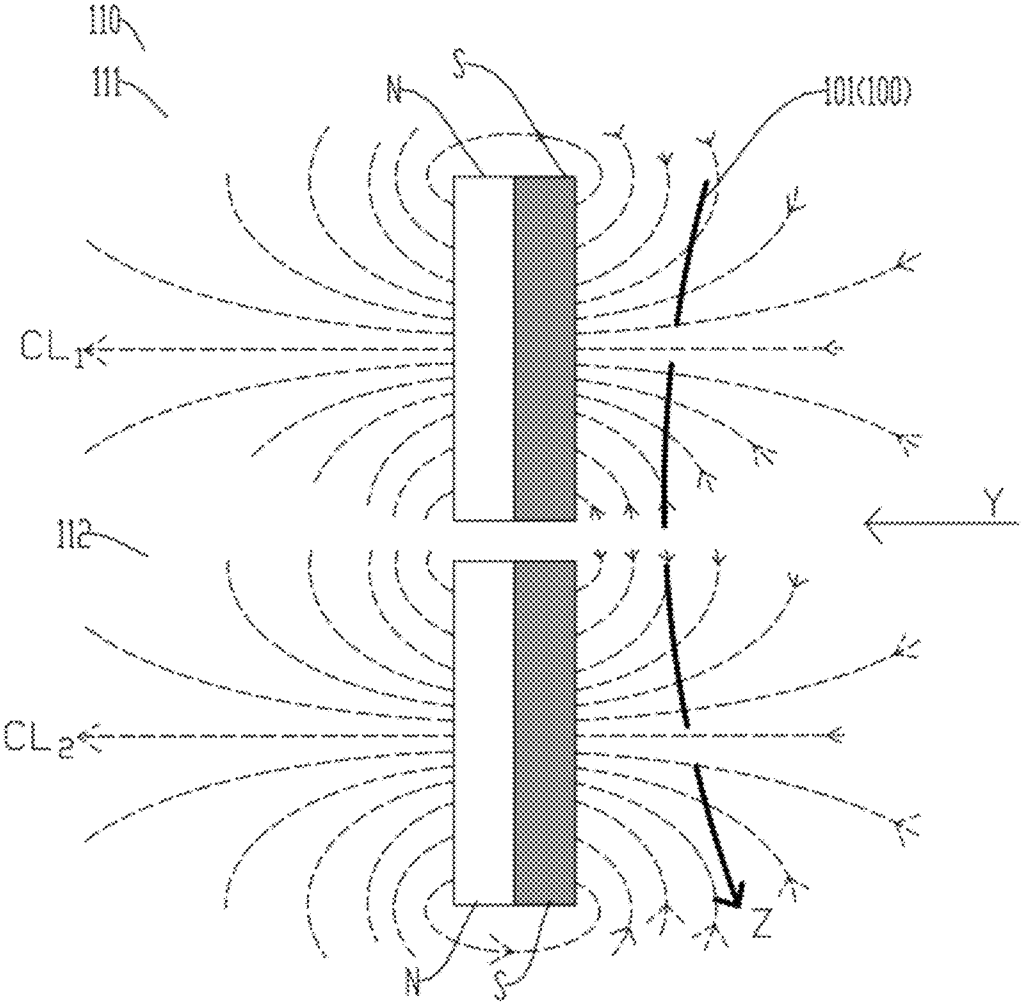
FIG. 8 is a diagram of a position relationship between distribution of magnetic induction lines of a first magnet assembly and an electric arc according to an implementation.
Figure 9:
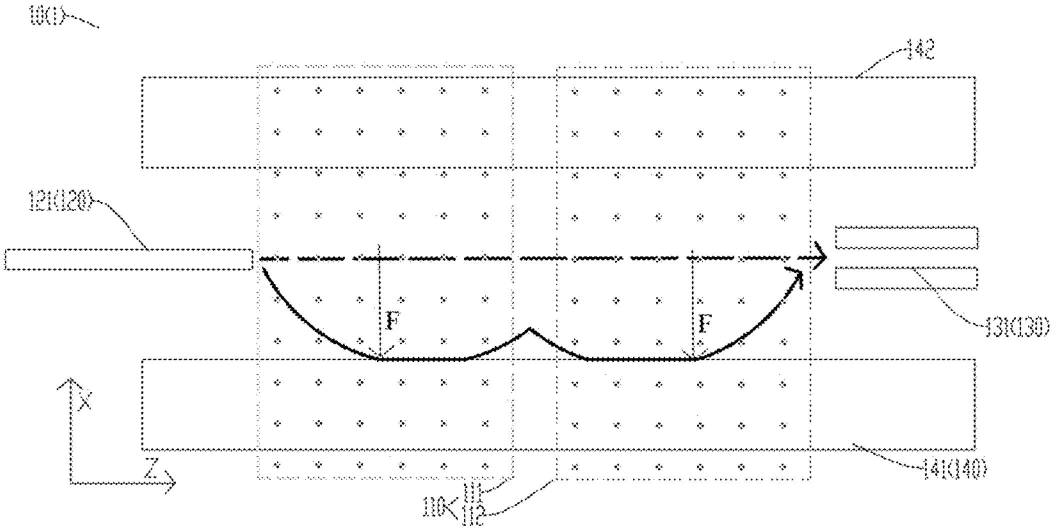
FIG. 9 is a schematic diagram illustrating that an electric arc moves under a magnetic field force according to an implementation.

Because magnetic induction lines of the first magnet 111 and the second magnet 112 are not evenly distributed, densities of magnetic induction lines at different positions are different. FIG. 8 is a position relationship between distribution of magnetic induction lines of a first magnet assembly 110 and an electric arc 100. An electric arc 100 in FIG. 8 is an electric arc 100 that is not subject to a magnetic field force. A current direction of the electric arc 100 is a third direction Z. Magnetic induction lines at positions of a middle line $CL_1$ of a first magnet 111 and a middle line $CL_2$ of a second magnet 112 are dense. The density of the magnetic induction lines gradually decreases from the middle line $CL_1$ to two sides of the middle line $CL_1$ along the third direction Z, and the density of the magnetic induction lines gradually decreases from the middle line $CL_2$ to two sides of the middle line $CL_2$ along the third direction Z, so that magnetic field forces applied to the electric arc 100 at the positions of the middle line $CL_1$ and the middle line $CL_2$ are the largest. After the electric arc 100 is subject to the magnetic field force, a movement path of the electric arc 100 in regions (namely, the positions of the middle line $CL_1$ and the middle line $CL_2$) in which the magnetic field forces are the largest is long, and the electric arc 100 in these regions are in contact with the arc-extinguishing functional component 140 first. An overall shape of the electric arc 100 is a large "U" shape (as shown in FIG. 6). In an implementation, if a distance between the first magnet 111 and the second magnet 112 is large, the shape of the electric arc 100 may alternatively be a "W" shape (as shown in FIG. 9). The electric arc 100 is stretched at the positions of the middle line $CL_1$ and the middle line $CL_2$, so that the electric arc 100 can be better cooled at two terminals along the third direction Z.

Figure 10:
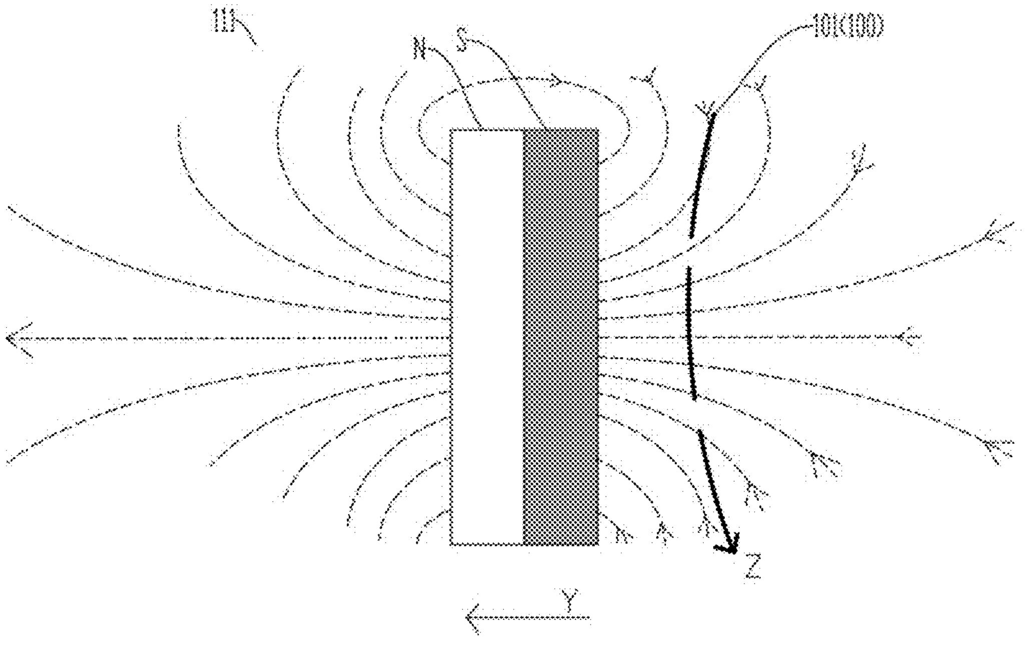
FIG. 10 is a diagram of a position relationship between distribution of magnetic induction lines of a first magnet and an electric arc according to an implementation.
Figure 11:
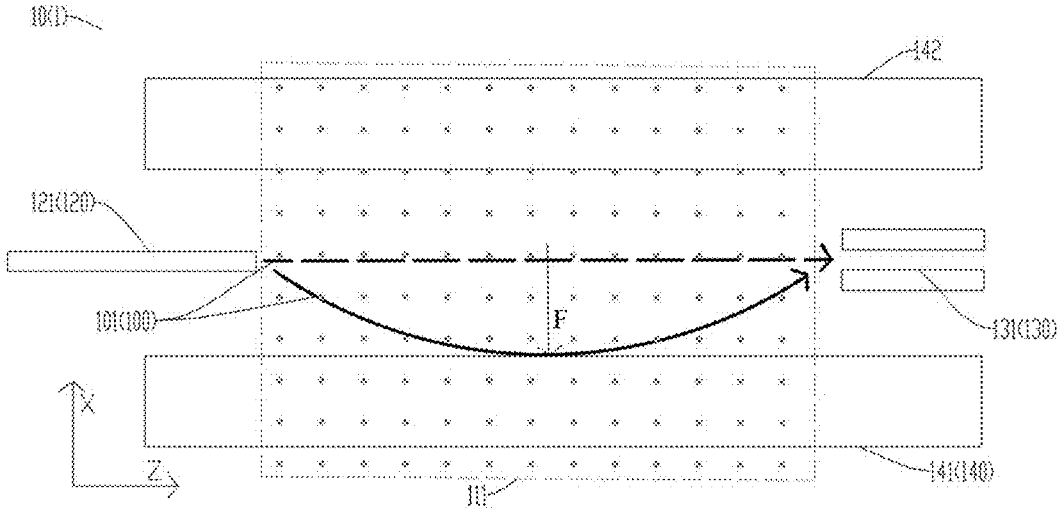
FIG. 11 is a schematic diagram illustrating that an electric arc moves under a magnetic field force according to an implementation.

If the first magnet assembly 110 is provided with only one magnet, for example, the first magnet assembly 110 includes only the first magnet 111 (as shown in FIG. 10 and FIG. 11). After the electric arc 100 moves under a magnetic field force, a shape of the electric arc 100 becomes a "V" shape, and the electric arc 100 is stretched only in the middle position. Compared with this implementation, if only one magnet is disposed, the electric arc 100 is stretched to a small extent under the force, and the electric arc 100 is stretched only the middle position. Because two terminals of the electric arc 100 along the third direction Z are stretched to a small extent, cooling effect is not good.

In this implementation, the first magnet 111 and the second magnet 112 in the first magnet assembly 110 function together. In this way, the electric arc 100 is subject to magnetic field forces of both the first magnet 111 and the second magnet 112. The electric arc 100 is stretched by the magnetic field forces of the two magnets, so that a bending degree of the electric arc 100 is greater. A greater stretching degree of the electric arc 100 indicates better cooling effect on the electric arc 100. In addition, two terminals of the electric arc 100 that are close to the fixed contact assembly 120 and the moving contact 130 are the parts with higher temperatures in the electric arc 100. Because two magnets, namely, the first magnet 111 and the second magnet 112, are disposed. Regions with the densest magnetic induction lines in the first magnet 111 and the second magnet 112 are respectively distributed on sides close to the fixed contact assembly 120 and the moving contact 130, so that the two terminals of the electric arc 100 that are close to the fixed contact assembly 120 and the moving contact 130 are at positions with larger magnetic field forces. The electric arc 100 is subject to a larger magnetic field force and has a longer movement path at a position with a higher temperature. This can improve cooling efficiency on the electric arc 100. Furthermore, the electric arc 100 is moved to the arc-extinguishing functional component 140 under the magnetic field force, and the electric arc 100 is cooled for a second time by using the arc-extinguishing functional component 140, so that a switch-off capability of the switch 1 is improved to a maximum extent. Additionally, the arc-extinguishing functional component 140 has a simple structure and low costs.

In a possible implementation, the fixed contact assembly 120 includes a first fixed contact 121 and a second fixed contact 122 that are spaced apart; the moving contact 130 includes a first terminal 131 and a second terminal 132 that are disposed opposite to each other; the operating mechanism 11 is configured to control the moving contact 130 to rotate; when the switch unit 10 is closed (as shown in FIG. 5*a*), the first terminal 131 and the second terminal 132 are respectively connected to the first fixed contact 121 and the second fixed contact 122 to conduct a current; when the switch unit 10 is opened, the moving contact 130 is rotated to separate the first terminal 131 from the first fixed contact 121 and separate the second terminal 132 from the second fixed contact 122 (as shown in FIG. 5*b*), to cut off the current and form a first electric arc 101 between the first terminal 131 and the first fixed contact 121; the first magnet 111 and the second magnet 112 are located on one side of the first electric arc 101; and the first magnet 111 and the second magnet 112 are both configured to increase a movement path of the first electric arc 101 and increase a contact area between the first electric arc 101 and the arc-extinguishing functional component 140. By disposing the first fixed contact 121, the second fixed contact 122, and the first terminal 131 and the second terminal 132 of the moving contact 130, connection performance of the switch unit 10 is better, improving a switch-on and a switch-off capability of the switch unit 10.

In the implementations shown in FIG. 4 and FIG. 5*b*, the arc-extinguishing functional component 140 includes the first sub-functional component 141 and the second sub-functional component 142 that are sequentially disposed in parallel along a first direction X. The fixed contact assembly 120 and the moving contact 130 are disposed between the first sub-functional component 141 and the second sub-functional component 142. The moving contact 130 is fastened to the arc-extinguishing functional component 140. The moving contact 130 and the arc-extinguishing functional component 140 can be rotated together relative to the fixed contact assembly 120. The first magnet assembly 110 is located on a side of the arc-extinguishing functional component 140 along a second direction Y. The second direction Y intersects the first direction X. The first magnet 111 is disposed close to the first fixed contact 121. The second magnet 112 is disposed close to the first terminal of the moving contact 130. The operating mechanism 11 controls the arc-extinguishing functional component 140 and the moving contact 130 to rotate counterclockwise together to separate the moving contact 130 from the fixed contact assembly 120, so that the switch 1 changes from a closed state to an open state.

For example, when the switch 1 is closed, the current direction A is sequentially from the first fixed contact 121 and the moving contact 130 to the second fixed contact 122; and when the switch 1 is opened, the current direction of the electric arc 100 generated between the first fixed contact 121 and the moving contact 130 is a third direction Z (as shown in FIG. 5*b*). The current direction of the electric arc 100 is from the first fixed contact 121 to the moving contact 130. The electric arc 100 moves towards the first sub-functional component 141 under a magnetic field force F (as shown in FIG. 6). The third direction Z intersects both the first direction X and the second direction Y. In an implementation, the first direction X and the second direction Y are approximately perpendicular to the third direction Z. In this implementation, the first sub-functional component 141 and the second sub-functional component 142 are circles with equal outer diameters. In another implementation, the first sub-functional component 141 and the second sub-functional component 142 may alternatively be squares, ellipses, irregular patterns, and the like. Shapes and sizes of the first sub-functional component 141 and the second sub-functional component 142 may be the same or different.

The first terminal 131 and the second terminal 132 of the moving contact 130 are both fastened to the arc-extinguishing functional component 140. During rotation, the arc-extinguishing functional component 140 can drive both the first terminal 131 and the second terminal 132 to rotate. An extension direction of the first fixed contact 121 is parallel to an extension direction of the second fixed contact 122. The first fixed contact 121 and the second fixed contact 122 are distributed at 180° on the arc-extinguishing functional component 140 (as shown in FIG. 5*b*), and the first terminal 131 and the second terminal 132 of the moving contact 130 are also distributed at 180° on the arc-extinguishing functional component 140, so that when the first terminal 131 of the moving contact 130 is connected to or disconnected from the first fixed contact 121, the second terminal 132 is connected to or disconnected from the second fixed contact 122.

In an implementation, an extension direction of the first fixed contact 121 may alternatively intersect an extension direction of the second fixed contact 122 at an angle, and the first terminal 131 and the second terminal 132 of the moving contact 130 are distributed at an angle, provided that when the first terminal 131 is connected to or disconnected from the first fixed contact 121, the second terminal 132 is also connected to or disconnected from the second fixed contact 122. By rotating the moving contact 130 by 90°, the switch unit 10 changes from the closed state to the open state. In another implementation, the moving contact 130 may be rotated by another angle, for example, 30°, 45°, 60°, or 75°. The moving contact 130 may be rotated clockwise or counterclockwise. A rotation direction and angle of the moving contact 130 are not limited.

A terminal of the first fixed contact 121 far away from the moving contact 130 is connected to a circuit board 3, and a terminal of the second fixed contact 122 far away from the moving contact 130 is connected to the circuit board 3, so that the switch unit 10 is connected to the circuit board 3. When the switch unit 10 is opened, a corresponding circuit in the circuit board 3 is controlled to be opened, to implement security protection.

In an implementation, the fixed contact assembly 120 is fastened relative to the arc-extinguishing functional component 140. The moving contact 130 can be rotated relative to the fixed contact assembly 120 and the arc-extinguishing functional component 140. The operating mechanism 11 controls the moving contact 130 to rotate counterclockwise to separate the moving contact 130 from the fixed contact assembly 120, so that the switch 1 changes from a closed state to an open state.

In an implementation, the arc-extinguishing functional component 140 is of an integrated structure. The first sub-functional component 141 and the second sub-functional component 142 are of an integrated structure with high strength. In an implementation, the arc-extinguishing functional component 140 and the moving contact 130 are of an integrated structure. In an implementation, the first sub-functional component 141 and the moving contact 130 are of an integrated structure. The second sub-functional component 142 is of an integrated structure. The first sub-functional component 141 is connected to the second sub-functional component 142 through welding, bonding, or the like to form the arc-extinguishing functional component 140.

In this implementation, the arc-extinguishing functional component 140 is provided with only the first sub-functional component 141 and the second sub-functional component 142, and the first sub-functional component 141 is disposed close to the second sub-functional component 142, so that the arc-extinguishing functional component 140 is flat. In this way, the electric arc 100 can come into contact with the arc-extinguishing functional component 140 through a short path, a contact area between the electric arc 100 and the arc-extinguishing functional component 140 increases, and cooling effect on the electric arc is improved by introducing the electric arc 100 onto the first sub-functional component 141 and the second sub-functional component 142 with large areas. In addition, a thickness of the arc-extinguishing functional component 140 in the first direction X is reduced, so that a size of the arc-extinguishing functional component 140 is reduced and is applicable to various miniaturization scenarios.

In an implementation, the first terminal 131 of the moving contact 130 includes a first connection block (not shown in the figure) and a second connection block (not shown in the figure) that are spaced apart. The first connection block is fastened to a side of the first sub-functional component 141 close to the second sub-functional component 142. The second connection block is fastened to a side of the second sub-functional component 142 close to the first sub-functional component 141. When the switch unit is closed, the first fixed contact 121 is located between the first connection block and the second connection block, so that the first fixed contact 121 is electrically connected to the first terminal 131 of the moving contact 130. In an implementation, the second terminal 132 of the moving contact 130 includes a third connection block and a fourth connection block that are spaced apart. The third connection block is fastened to a side of the first sub-functional component 141 close to the second sub-functional component 142. The fourth connection block is fastened to a side of the second sub-functional component 142 close to the first sub-functional component 141. When the switch unit is closed, the second fixed contact 122 is located between the third connection block and the fourth connection block, so that the second fixed contact 122 is electrically connected to the second terminal 132 of the moving contact 130.

In this embodiment, the first magnet 111 and the second magnet 112 are arranged in a same direction (as shown in FIG. 5*b*) to drive the first electric arc 101 to move towards a same side of the arc-extinguishing functional component 140, increase the movement path of the first electric arc 101, and increase the contact area between the first electric arc 101 and the arc-extinguishing functional component 140. That the first magnet 111 and the second magnet 112 are arranged in the same direction means that the north poles N and the south poles S of the first magnet 111 and the second magnet 112 are arranged in the same direction. In this embodiment, the south poles S of the first magnet 111 and the second magnet 112 are both disposed close to the first electric arc 101, and the north poles N of the first magnet 111 and the second magnet 112 are disposed far away from the first electric arc 101 (as shown in FIG. 5*b*). In addition, an arrangement direction of the south pole S and the north pole N is coplanar with a surface of the first sub-functional component 141 or the second sub-functional component 142.

The current direction of the first electric arc 101 affects a moving direction of the first electric arc 101 under a magnetic field force. If the switch unit 10 is closed, the current direction is from the first fixed contact 121 to the second fixed contact 122. When the switch unit 10 is opened, the current direction of the first electric arc 101 is from the first fixed contact 121 to the first terminal 131 of the moving contact 130 (as shown in FIG. 5*b*), that is, the third direction Z. A current direction of a second electric arc 102 is from the second terminal 132 of the moving contact 130 to the second fixed contact 122, that is, the third direction Z.

In an implementation, the second magnet 112 is located on a side of the first magnet 111 along the third direction Z. The south poles S of the first magnet 111 and the second magnet 112 are both disposed close to the first electric arc 101, and the north poles N of the first magnet 111 and the second magnet 112 are disposed far away from the first electric arc 101 (as shown in FIG. 5*b*). The first magnet 111 and the second magnet 112 jointly drive the first electric arc 101 to move towards the first sub-functional component 141 (as shown in FIG. 6). The first electric arc 101 is subject to magnetic field forces of both the first magnet 111 and the second magnet 112, so that the first electric arc 101 is stretched to a greater degree. This is more conducive to cooling of the first electric arc 101.

Figure 12:
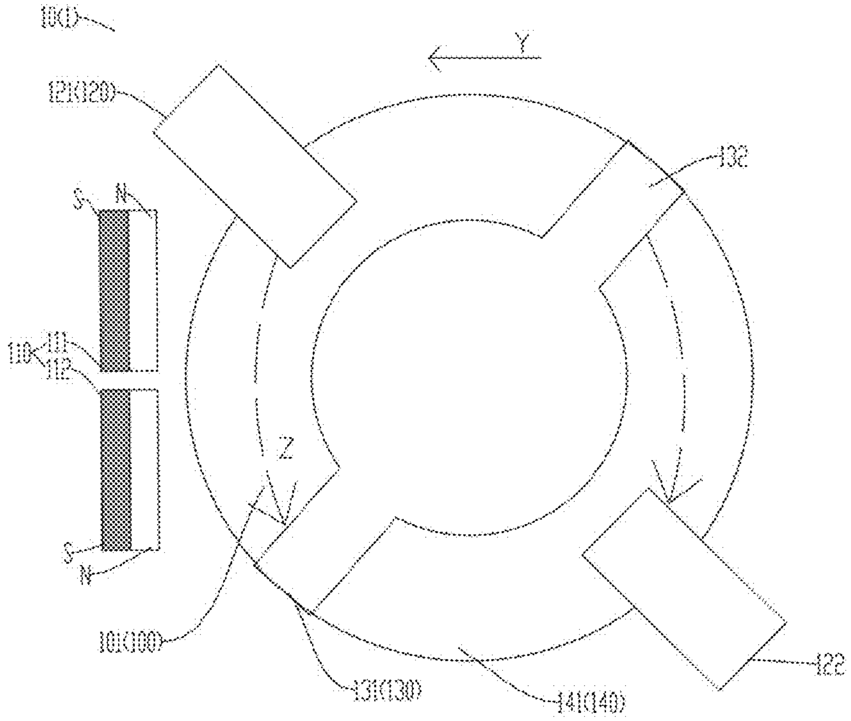
FIG. 12 is a schematic diagram of a switch according to an implementation.

FIG. 12 is a schematic diagram of a switch according to an implementation. FIG. 13 is a schematic diagram illustrating that an electric arc in FIG. 12 moves under a magnetic field force. In this implementation, north poles N of both a first magnet 111 and a second magnet 112 are disposed close to a first electric arc 101, and south poles S of the first magnet 111 and the second magnet 112 are disposed far away from the first electric arc 101 (as shown in FIG. 12). The second magnet 112 is located on a side of the first magnet 111 along a third direction Z. The north poles N of the first magnet 111 and the second magnet 112 are both disposed close to the first electric arc 101, and the south poles S of the first magnet 111 and the second magnet 112 are disposed far away from the first electric arc 101 (as shown in FIG. 12). The first magnet 111 and the second magnet 112 jointly drive the first electric arc 101 to move towards the second sub-functional component 142 (as shown in FIG. 13). The first electric arc 101 is subject to magnetic field forces of both the first magnet 111 and the second magnet 112, so that the first electric arc 101 is stretched to a greater degree. This is more conducive to cooling of the first electric arc 101.

Figure 14:
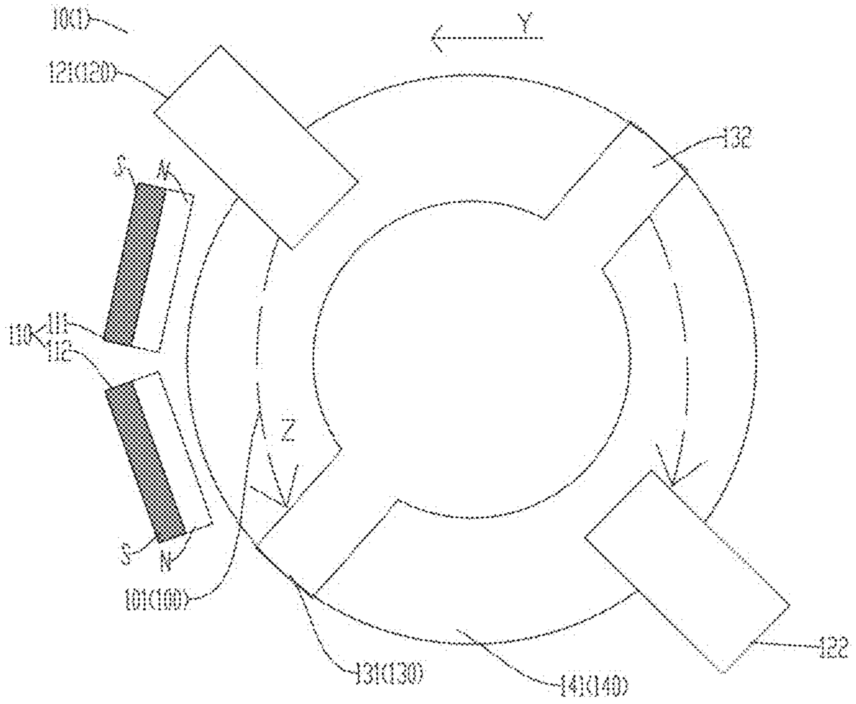
FIG. 14 is a schematic diagram of a switch according to Embodiment 1.

In a possible implementation, an extension direction of the first magnet 111 intersects an extension direction of the second magnet 112 (as shown in FIG. 14), so that the first magnet assembly 110 drives the first electric arc 101 at a larger force and a volume of the switch 1 is reduced. The first magnet 111 and the second magnet 112 are disposed in close contact with an arc-extinguishing functional component 140 and the first electric arc 101. In this implementation, the arc-extinguishing functional component 140 is circular, and surfaces of the first magnet 111 and the second magnet 112 that are close to the arc-extinguishing functional component 140 are both perpendicular to a radial direction of the arc-extinguishing functional component 140. The magnet assembly 110 is disposed close to the first electric arc 101, so that a magnetic field force applied on the first electric arc 101 is larger, and the magnet assembly 110 can better drive the first electric arc 101 to move. This is conducive to cooling of the first electric arc 101. In addition, because the magnet assembly 110 is in close contact with the arc-extinguishing functional component 140 and the first electric arc 101, a volume of a switch unit 10 is reduced, and a volume of the switch 1 is further reduced.

In an implementation, an extension direction of the first magnet 111 may alternatively be parallel to an extension direction of the second magnet 112 (as shown in FIG. 12), and the first magnet 111 and the second magnet 112 are on a same straight line.

Figure 15:
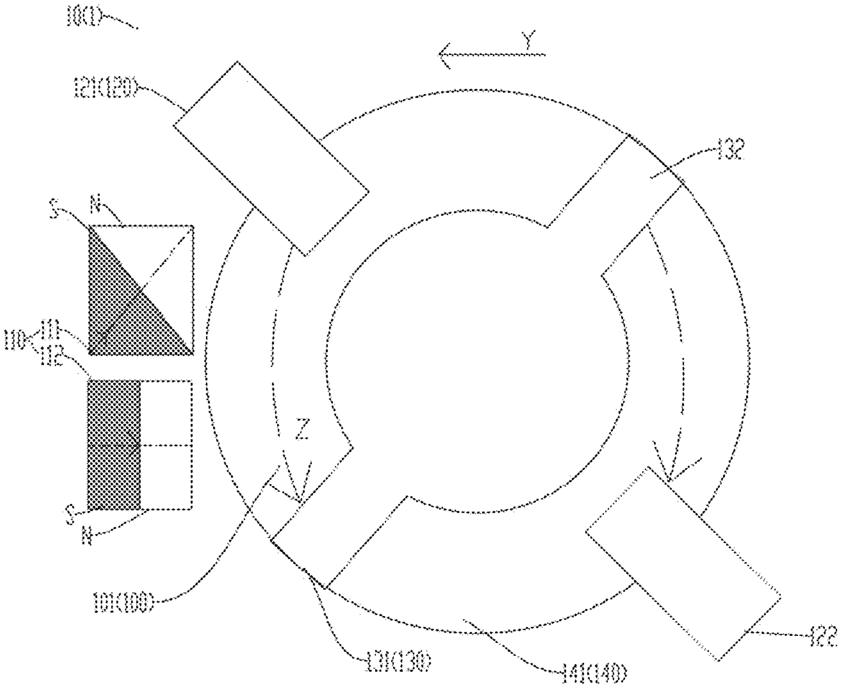
FIG. 15 is another schematic diagram of a switch according to Embodiment 1 of this application.

In a possible implementation, an extension direction of the first magnet 111 is the same as an extension direction of the second magnet 112, and a direction of a magnetic induction line inside the first magnet 111 intersects a direction of a magnetic induction line inside the second magnet 112 (as shown in FIG. 15), so that the first electric arc 101 is in close contact with the arc-extinguishing functional component 140. The direction of the magnetic induction line inside the first magnet 111 is the direction from the south pole S of the first magnet 111 to the north pole N of the first magnet 111. The direction of the magnetic induction line inside the second magnet 112 is the direction from the south pole S of the second magnet 112 to the north pole N of the second magnet 112. In an actual scenario, the first electric arc 101 may be a curve, the arc-extinguishing functional component 140 may be an uneven enclosure, and the direction of the magnetic induction line inside the first magnet 111 is different from the direction of the magnetic induction line inside the second magnet 112 by a preset angle. A magnetic field direction is adjusted to control a moving direction of the first electric arc 101, so that the first electric arc 101 can move onto the arc-extinguishing functional component 140 more quickly, facilitating cooling of the first electric arc 101.

In an implementation, the direction of the magnetic induction line inside the first magnet 111 is parallel to the direction of the magnetic induction line inside the second magnet 112 (as shown in FIG. 12).

In an implementation, a thickness of the first magnet assembly 110 in a first direction X is greater than a thickness of the arc-extinguishing functional component 140 in the first direction X, so that the first electric arc 101 can better move under a magnetic field force, improving a cooling speed of the first arc 101.

In a possible implementation, the switch unit 10 further includes a second magnet assembly 150. When the switch unit 10 is opened, a second electric arc 102 is formed between the second terminal 132 of the moving contact 130 and the second fixed contact 122. The first magnet 111 and the second magnet 112 are located on a side of the first electric arc 101 far away from the second electric arc 102. Directions of at least some magnetic induction lines in the second magnet assembly 150 intersect a current direction of the second electric arc 102 to drive the second electric arc 102 to move. The second magnet assembly 150 further includes a fourth magnet 151 and a fifth magnet 152 that are spaced apart. The fourth magnet 151 and the fifth magnet 152 are located on a side of the second electric arc 102 far away from the first electric arc 101. The fourth magnet 151 and the fifth magnet 152 are both configured to increase a moving path of the second electric arc 102 and increase a contact area between the second electric arc 102 and the arc-extinguishing functional component 140, to cool the second electric arc 102, improve cooling effect on the second electric arc 102, and further improve a switch-off capability of the switch unit 10.

In an implementation, the second magnet assembly 150 is the same as the first magnet assembly 110. For example, the first magnet 111, the second magnet 112, the fourth magnet 151, and the fifth magnet 152 are all arranged in a same direction (as shown in FIG. 5*b*), north poles N of the first magnet 111 and the second magnet 112 are both disposed close to the first electric arc 101 and south poles S of the first magnet 111 and the second magnet 112 are disposed far away from the first electric arc 101, and north poles N of the fourth magnet 151 and the fifth magnet 152 are both disposed close to the second electric arc 102 and south poles S of the fourth magnet 151 and the fifth magnet 152 are disposed far away from the second electric arc 102.

In an implementation, a quantity of magnets included in the second magnet assembly 150 may be the same as or different from a quantity of magnets included in the first magnet assembly 110. This is not limited herein.

In a possible implementation, the first magnet assembly 110 and the second magnet assembly 150 are located on two sides of the arc-extinguishing functional component 140 along a radial direction of the arc-extinguishing functional component 140, the first magnet assembly 110 is disposed close to the first fixed contact 121 to improve cooling effect on the first electric arc 101, and the second magnet assembly 150 is disposed close to the second fixed contact 122 to improve cooling effect on the second electric arc 102. The first magnet assembly 110 is located on a side of the arc-extinguishing functional component 140 close to the first fixed contact 121 along a second direction Y. The second magnet assembly 150 is located on a side of the arc-extinguishing functional component 140 close to the second fixed contact 122 along the second direction X. By disposing the first magnet assembly 110 and the second magnet assembly 150, the first electric arc 101 and the second electric arc 102 that are formed when the switch unit 10 is opened can be cooled under magnetic field forces in a manner of stretching the electric arcs and moving onto the arc-extinguishing functional component 140, thereby improving a switch-off capability of the switch unit 10, and ensuring secure operation of the power supply system.

Figure 16:
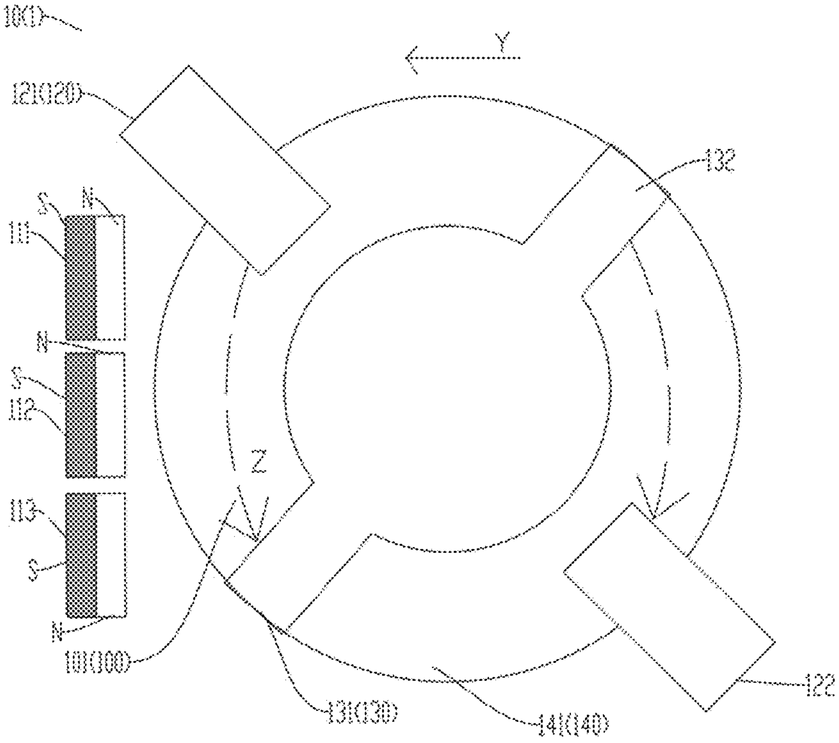
FIG. 16 is a schematic diagram of a switch according to Embodiment 2.
Figure 17:
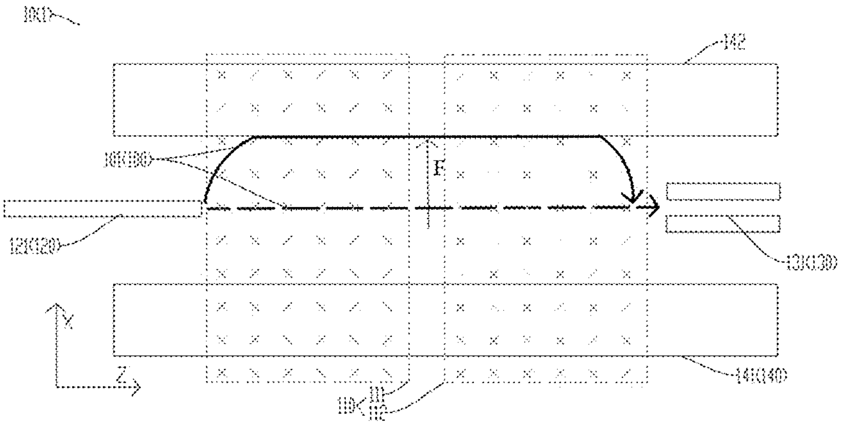
FIG. 17 is a schematic diagram illustrating that an electric arc moves under a magnetic field force according to Embodiment 2.

FIG. 16 is a schematic diagram of a switch 1 according to Embodiment 2. FIG. 17 is a schematic diagram illustrating that an electric arc 100 in Embodiment 2 moves under a magnetic field force. A difference between Embodiment 2 and Embodiment 1 is that a first magnet assembly 110 further includes a third magnet 113. A first magnet 111, a second magnet 112, and the third magnet 113 are all arranged in a same direction to drive a first electric arc 101 to move towards a same side of an arc-extinguishing functional component 140, increase a movement path of the first electric arc 101, and increase a contact area between the first electric arc 101 and the arc-extinguishing functional component 140.

In an implementation, the first magnet 111, the second magnet 112, and the third magnet 113 are sequentially arranged along a third direction Z. North poles N of the first magnet 111, the second magnet 112, and the third magnet 113 are all disposed close to the first electric arc 101 and south poles S of the first magnet 111, the second magnet 112, and the third magnet 113 are disposed far away from the first electric arc 101. The first magnet 111, the second magnet 112, and the third magnet 113 jointly drive the first electric arc 101 to move towards a second sub-functional component 142. The first electric arc 101 is simultaneously subject to magnetic field forces of three magnets, so that the first electric arc 101 is stretched to a greater degree. This is more conducive to cooling of the electric arc 100. Also, two terminals of the first electric arc 101 with higher temperatures are stretched to a greater degree. This is more conducive to improving cooling efficiency of the first electric arc 101.

In an implementation, the first magnet 111, the second magnet 112, and the third magnet 113 are sequentially arranged along a third direction Z. South poles S of the first magnet 111, the second magnet 112, and the third magnet 113 are all disposed close to the first electric arc 101 and north poles N of the first magnet 111, the second magnet 112, and the third magnet 113 are disposed far away from the first electric arc 101. The first magnet 111, the second magnet 112, and the third magnet 113 jointly drive the first electric arc 101 to move towards a first sub-functional component 141. The first electric arc 101 is simultaneously subject to magnetic field forces of three magnets, so that the first electric arc 101 is stretched to a greater degree. This is more conducive to cooling of the electric arc 100. Also, two terminals of the first electric arc 101 with higher temperatures are stretched to a greater degree. This is more conducive to improving cooling efficiency of the first electric arc 101.

In a possible implementation, an extension direction of the first magnet 111 and an extension direction of the second magnet 112 both intersect an extension direction of the third magnet 113, so that a magnet assembly 110 drives the first electric arc 101 at a larger force and a volume of the switch 1 is reduced. In an implementation, an extension direction of the first magnet 111 is the same as an extension direction of the second magnet 112 and intersects an extension direction of the third magnet 113. In an implementation, an extension direction of the first magnet 111 and an extension direction of the second magnet 112 are the same as an extension direction of the third magnet 113.

In some implementations, the first magnet assembly 110 may further include more magnets disposed in a same direction. A quantity of magnets may be set as required.

Figure 18:
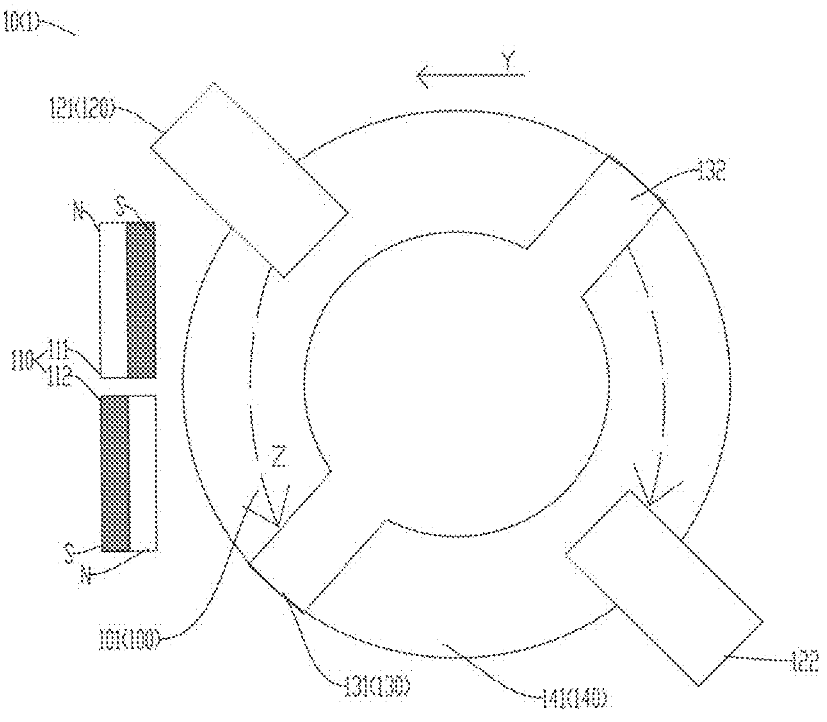
FIG. 18 is a schematic diagram of a switch according to Embodiment 3.
Figure 19:
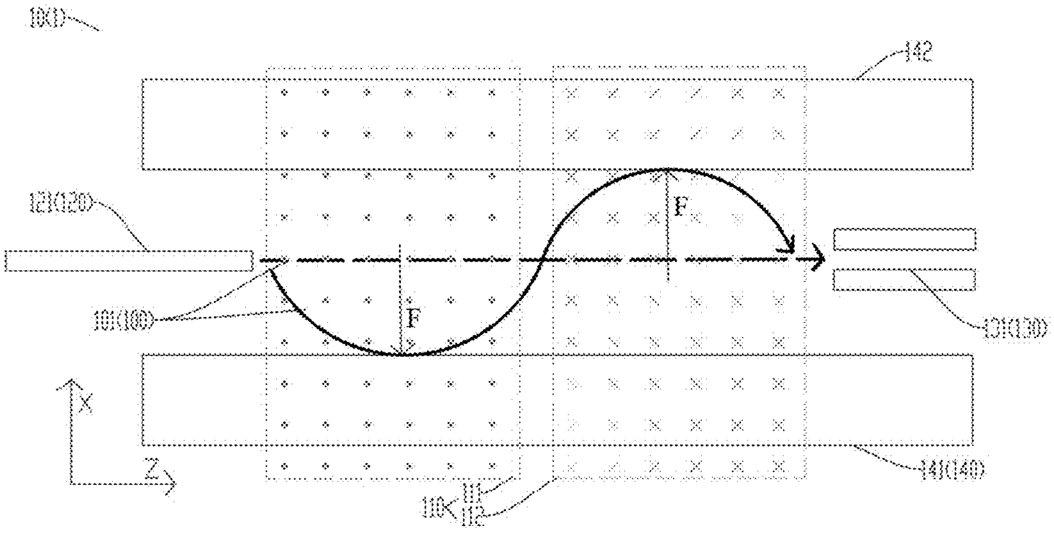
FIG. 19 is a schematic diagram illustrating that an electric arc moves under a magnetic field force according to Embodiment 3.

19. FIG. 18 is a schematic diagram of a switch 1 according to Embodiment 3. FIG. 19 is a schematic diagram illustrating that an electric arc 100 moves under a magnetic field force according to Embodiment 3. Embodiments 3 may provide a power supply system. A difference between Embodiment 3 and Embodiment 1 is that an arc-extinguishing functional component 140 includes a first sub-functional component 141 and a second sub-functional component 142 that are disposed opposite to each other, and a first magnet 111 and a second magnet 112 are arranged in opposite directions. The first magnet 111 is configured to drive a part of a first electric arc 101 to move towards the first sub-functional component 141, and the second magnet 112 is configured to drive a part of the first electric arc 101 to move towards the second sub-functional component 142 to increase a movement path of the first electric arc 101. The first magnet 111 is configured to increase a contact area between the first electric arc 101 and the first sub-functional component 141, and the second magnet 112 is configured to increase a contact area between the first electric arc 101 and the second sub-functional component 142, so that the first sub-functional component 141 and the second sub-functional component 142 are both configured to cool the first electric arc. The first magnet 111 and the second magnet 112 being arranged in opposite directions means that north poles N and south poles S of the first magnet 111 and the second magnet 112 may be arranged in opposite directions. The south pole S of the first magnet 111 may be disposed close to the first electric arc 101 and the north pole N of the first magnet 111 may be disposed far away from the first electric arc 101 (as shown in FIG. 18), and the north pole N of the second magnet 112 may be disposed close to the first electric arc 101 and the south pole S of the second magnet 112 may be disposed far away from the first electric arc 101. By disposing the first magnet 111 and the second magnet 112 that are arranged in opposite directions, the first electric arc 101 is approximately in an "S" shape (as shown in FIG. 19), which prolongs the length of the first electric arc 101, accelerating cooling of the first electric arc 101. In addition, the first electric arc 101 is cooled by fully using the first sub-functional component 141 and the second sub-functional component 142, increasing an area of the arc-extinguishing functional component 140 that can be configured to cool the first electric arc 101, and improving the cooling effect and efficiency of the first electric arc 101.

In an implementation, the first magnet 111 and the second magnet 112 are arranged in opposite directions. The north pole N of the first magnet 111 is disposed close to the first electric arc 101 and the south pole S of the first magnet 111 is disposed far away from the first electric arc 101 to drive a part of the first electric arc 101 to move towards the second sub-functional component 142. The south pole S of the second magnet 112 is disposed close to the first electric arc 101 and the north pole N of the second magnet is disposed far away from the first electric arc 101 to drive a part of the first electric arc 101 to move towards the first sub-functional component 141.

Figure 20:
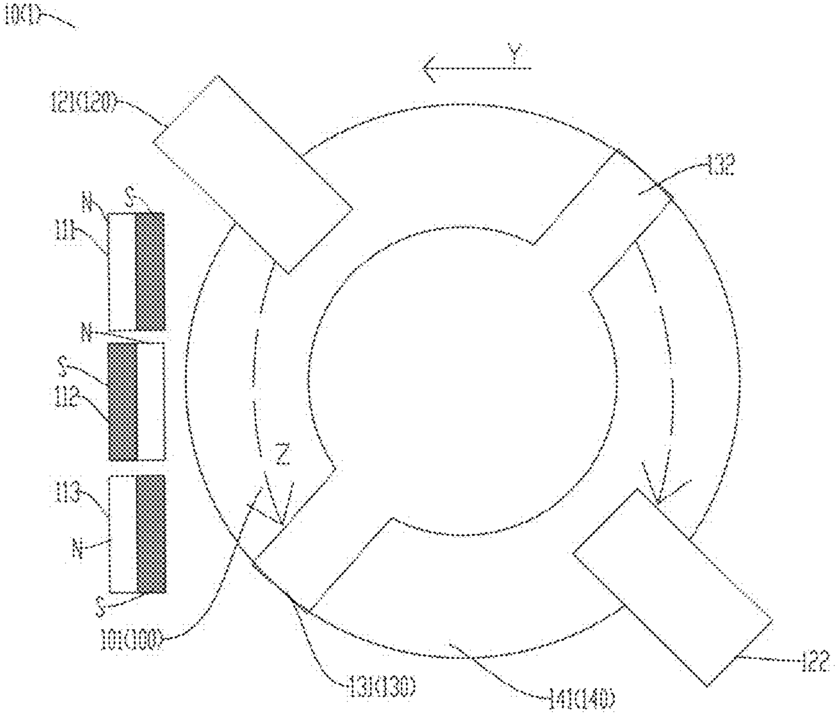
FIG. 20 is a schematic diagram of a switch according to Embodiment 4.

FIG. 20 is a schematic diagram of a switch 1 according to Embodiment 4. Embodiment 4 may provide a power supply system. A difference between Embodiment 4 and Embodiment 3 is that a first magnet assembly 110 further includes a third magnet 113. A first magnet 111, a second magnet 112, and the third magnet 113 are sequentially arranged. The third magnet 113 and the second magnet 112 are arranged in opposite directions. The third magnet 113 is configured to drive a part of a first electric arc 101 to move towards a first sub-functional component 141, to increase a movement path of the first electric arc 101. The third magnet 113 is configured to increase a contact area between the first electric arc 101 and the first sub-functional component 141, to improve cooling effect of the first sub-functional component 141 on the first electric arc 101.

The first magnet 111, the second magnet 112, and the third magnet 113 are sequentially arranged to limit a relative position relationship between the first magnet 111, the second magnet 112, and the third magnet 113. The first magnet 111 and the third magnet 113 are separately located on two sides of the second magnet 112 along a third direction Z. That the third magnet 113 and the second magnet 112 are arranged in opposite directions means that north poles N and south poles S of the third magnet 113 and the second magnet 112 are arranged in opposite directions. In this embodiment, the third magnet 113 and the second magnet 112 are arranged in opposite directions, and the third magnet 113 and the first magnet 111 are arranged in a same direction. The south poles S of the first magnet 111 and the third magnet 113 may be disposed close to the first electric arc 101, and the north poles N of the first magnet 111 and the third magnet 113 may be disposed far away from the first electric arc 101; and the north pole N of the second magnet 112 may be disposed close to the first electric arc 101, and the south pole S of the second magnet 112 may be disposed far away from the first electric arc 101.

By disposing the first magnet 111, the second magnet 112, and the third magnet 113, the first electric arc 101 is approximately in a "W" shape or a wave shape. In this way, the first electric arc 101 is simultaneously subject to magnetic field forces of three magnets, prolonging the length of the first electric arc 101. This is more conducive to quick cooling of the first electric arc 101. In addition, the first electric arc 101 is cooled by fully using the first sub-functional component 141 and the second sub-functional component 142, increasing an area of the arc-extinguishing functional component 140 that can be configured to cool the first electric arc 101, and improving the cooling effect and efficiency of the first electric arc 101. Furthermore, the first electric arc 101 is simultaneously subject to magnetic field forces of three magnets, so that two terminals of the first electric arc 101 with higher temperatures are stretched to a greater degree. This is more conducive to improving the cooling efficiency of the first electric arc 101.

In an implementation, that the third magnet 113 and the second magnet 112 are arranged in opposite directions and the third magnet 113 and the first magnet 111 are arranged in a same direction may alternatively mean that the north poles N of the first magnet 111 and the third magnet 113 are disposed close to the first electric arc 101 and the south poles S of the first magnet 111 and the third magnet 113 are disposed far away from the first electric arc 101, and the south pole S of the second magnet 112 is disposed close to the first electric arc 101 and the north pole N of the second magnet 112 is disposed far away from the first electric arc 101. In this case, the first magnet 111 and the third magnet 113 drive a part of the first electric arc 101 to move towards the second sub-functional component 142, and the second magnet 112 drives a part of the first electric arc 101 to move towards the first sub-functional component 141, so that the first electric arc 101 is approximately of an "M" shape. In this way, the first electric arc 101 is simultaneously subject to magnetic field forces of three magnets, prolonging a length of the first electric arc 101. This is conducive to quick cooling of the first electric arc 101. In addition, the first electric arc 101 is cooled by fully using the first sub-functional component 141 and the second sub-functional component 142, increasing an area of the arc-extinguishing functional component 140 that can be configured to cool the first electric arc 101, and improving the cooling effect and efficiency of the first electric arc 101. Furthermore, the first electric arc 101 is simultaneously subject to magnetic field forces of three magnets, so that two terminals of the first electric arc 101 with higher temperatures are stretched to a greater degree. This is more conducive to improving the cooling efficiency of the first electric arc 101.

Figure 21:
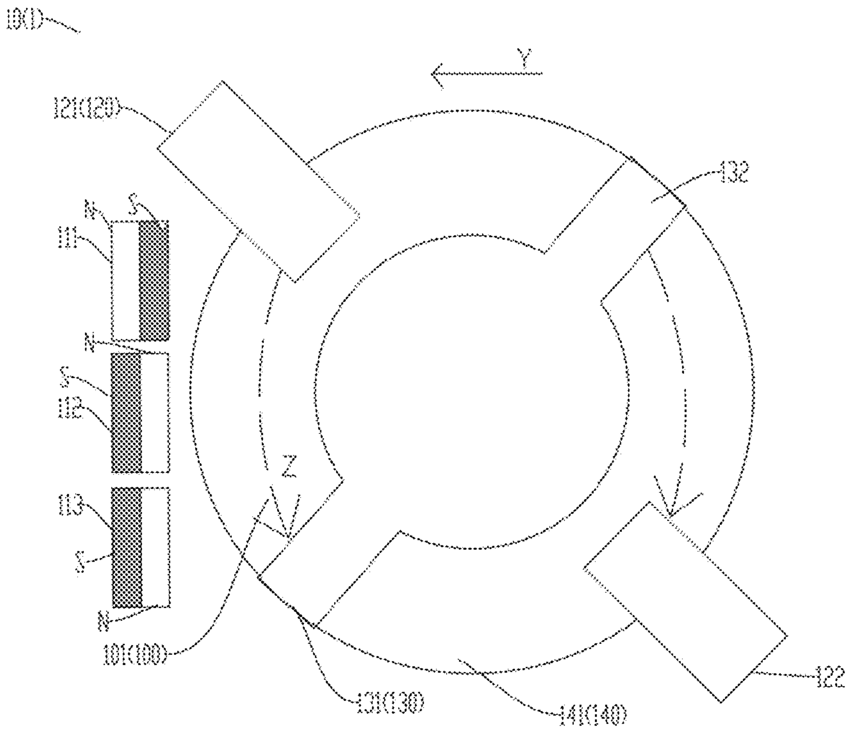
FIG. 21 is a schematic diagram of a switch according to Embodiment 5.

FIG. 21 is a schematic diagram of a switch 1 according to Embodiment 5. Embodiment 5 may provide a power supply system. A difference between Embodiment 5 and Embodiment 3 is that a first magnet assembly 110 further includes a third magnet 113. A first magnet 111, a second magnet 112, and the third magnet 113 are sequentially arranged. The third magnet 113 and the second magnet 112 are arranged in a same direction. The third magnet 113 is configured to drive a part of a first electric arc 101 to move towards a second sub-functional component 142, to increase a movement path of the first electric arc 101. The third magnet 113 is configured to increase a contact area between the first electric arc 101 and the second sub-functional component 142, to improve cooling effect of the second sub-functional component 142 on the first electric arc 101. In this embodiment, the third magnet 113 and the second magnet 112 are arranged in the same direction, and the third magnet 113 and the first magnet 111 are arranged in opposite directions. A south pole S of the first magnet 111 may be disposed close to the first electric arc 101, and a north pole N of the first magnet 111 may be disposed far away from the first electric arc 101; north poles N of the second magnet 112 and the third magnet 113 may be disposed close to the first electric arc 101, and south poles S of the second magnet 112 and the third magnet 113 may be disposed far away from the first electric arc 101. By disposing the first magnet 111, the second magnet 112, and the third magnet 113, the first electric arc 101 is approximately in an "S" shape. In this way, the first electric arc 101 is simultaneously subject to magnetic field forces of three magnets, prolonging a length of the first electric arc 101. This is more conducive to quick cooling of the first electric arc 101. In addition, the first electric arc 101 is cooled by fully using the first sub-functional component 141 and the second sub-functional component 142, increasing an area of the arc-extinguishing functional component 140 that can be configured to cool the first electric arc 101, and improving the cooling effect and efficiency of the first electric arc 101. Furthermore, the first electric arc 101 is simultaneously subject to magnetic field forces of magnets, so that two terminals of the first electric arc 101 with higher temperatures are stretched to a greater degree. This is more conducive to improving the cooling efficiency of the first electric arc 101.

In an implementation, that the third magnet 113 and the second magnet 112 are arranged in a direction and the third magnet 113 and the first magnet 111 are arranged in opposite directions may alternatively mean that the north pole N of the first magnet 111 is disposed close to the first electric arc 101 and the south pole S of the first magnet 111 is disposed far away from the first electric arc 101, and the south poles S of the second magnet 112 and the third magnet 113 are disposed close to the first electric arc 101 and the north poles N of the second magnet 112 and the third magnet 113 are disposed far away from the first electric arc 101. In this case, the first magnet 111 drives a part of the first electric arc 101 to move towards the second sub-functional component 142, and the second magnet 112 and the third magnet 113 drive a part of the first electric arc 101 to move towards the first sub-functional component 141, so that the first electric arc 101 is approximately of an "S" shape. In this way, the first electric arc 101 is simultaneously subject to magnetic field forces of three magnets, prolonging a length of the first electric arc 101. This is conducive to quick cooling of the first electric arc 101. In addition, the first electric arc 101 is cooled by fully using the first sub-functional component 141 and the second sub-functional component 142, increasing an area of the arc-extinguishing functional component 140 that can be configured to cool the first electric arc 101, and improving the cooling effect and efficiency of the first electric arc 101. Furthermore, the first electric arc 101 is simultaneously subject to magnetic field forces of three magnets, so that two terminals of the first electric arc 101 with higher temperatures are stretched to a greater degree. This is more conducive to improving the cooling efficiency of the first electric arc 101.

Figure 22:
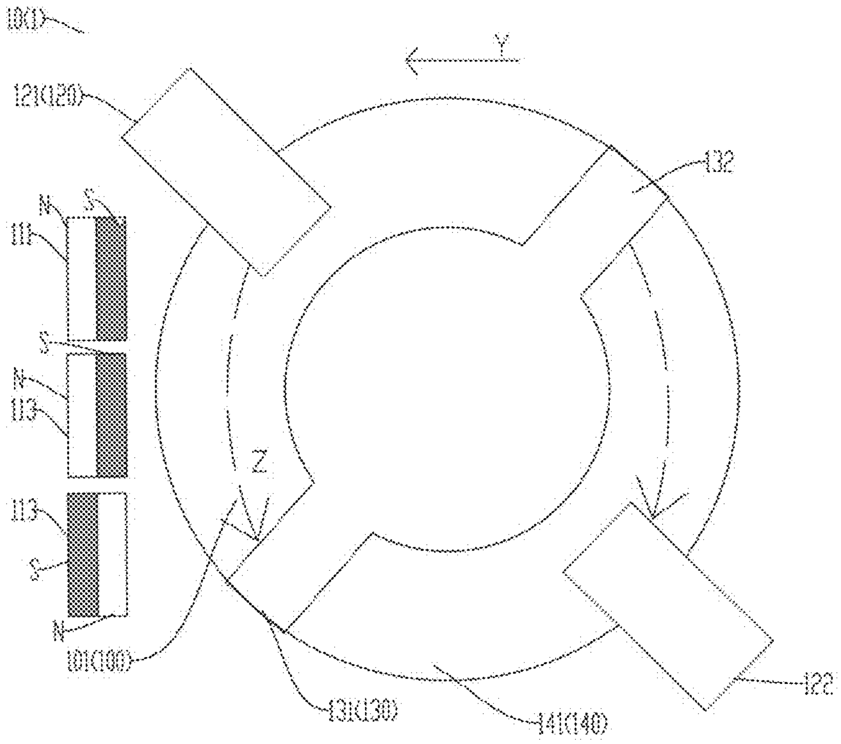
FIG. 22 is a schematic diagram of a switch according to Embodiment 6.

FIG. 22 is a schematic diagram of a switch 1 according to Embodiment 6. Embodiment 6 may provide a power supply system. A difference between Embodiment 6 and Embodiment 3 is that a first magnet assembly 110 further includes a third magnet 113. The third magnet 113 is located between a first magnet 111 and a second magnet 112. The third magnet 113 and the first magnet 111 are arranged in a same direction. The third magnet 113 is configured to drive a part of a first electric arc 101 to move towards a first sub-functional component 141, to increase a movement path of the first electric arc 101. The third magnet 113 is configured to increase a contact area between the first electric arc 101 and the first sub-functional component 141, to improve cooling effect of the first sub-functional component 141 on the first electric arc 101. In this embodiment, the third magnet 113 and the second magnet 112 are arranged in opposite directions, and the third magnet 113 and the first magnet 111 are arranged in a same direction. South poles S of the first magnet 111 and the third magnet 113 may be disposed close to the first electric arc 101, and north poles N of the first magnet 111 and the third magnet 113 may be disposed far away from the first electric arc 101; a north pole N of the second magnet 112 may be disposed close to the first electric arc 101, and a south pole S may be disposed far away from the first electric arc 101.

By disposing the first magnet 111, the second magnet 112, and the third magnet 113, the first electric arc 101 is approximately in an "S" shape. In this way, the first electric arc 101 is simultaneously subject to magnetic field forces of three magnets, prolonging the length of the first electric arc 101. This is more conducive to quick cooling of the first electric arc 101. In addition, the first electric arc 101 is cooled by fully using the first sub-functional component 141 and the second sub-functional component 142, increasing an area of the arc-extinguishing functional component 140 that can be configured to cool the first electric arc 101, and improving the cooling effect and efficiency of the first electric arc 101. Furthermore, the first electric arc 101 is simultaneously subject to magnetic field forces of three magnets, so that two terminals of the first electric arc 101 with higher temperatures are stretched to a greater degree. This is more conducive to improving the cooling efficiency of the first electric arc 101.

In an implementation, the third magnet 113 is located between the first magnet 111 and the second magnet 112. That the third magnet 113 and the second magnet 112 are arranged in opposite directions and the third magnet 113 and the first magnet 111 are arranged in a same direction may alternatively mean that the north poles N of the first magnet 111 and the third magnet 113 are disposed close to the first electric arc 101 and the south poles S of the first magnet 111 and the third magnet 113 are disposed far away from the first electric arc 101, and the south pole S of the second magnet 112 is disposed close to the first electric arc 101 and the north pole N of the second magnet 112 is disposed far away from the first electric arc 101. In this case, the first magnet 111 and the third magnet 113 drive a part of the first electric arc 101 to move towards the second sub-functional component 142, and the second magnet 112 drives a part of the first electric arc 101 to move towards the first sub-functional component 141, so that the first electric arc 101 is approximately of an "S" shape. In this way, the first electric arc 101 is simultaneously subject to magnetic field forces of three magnets, prolonging a length of the first electric arc 101. This is conducive to quick cooling of the first electric arc 101. In addition, the first electric arc 101 is cooled by fully using the first sub-functional component 141 and the second sub-functional component 142, increasing an area of the arc-extinguishing functional component 140 that can be configured to cool the first electric arc 101, and improving the cooling effect and efficiency of the first electric arc 101. Furthermore, the first electric arc 101 is simultaneously subject to magnetic field forces of three magnets, so that two terminals of the first electric arc 101 with higher temperatures are stretched to a greater degree. This is more conducive to improving the cooling efficiency of the first electric arc 101.

Figure 23:
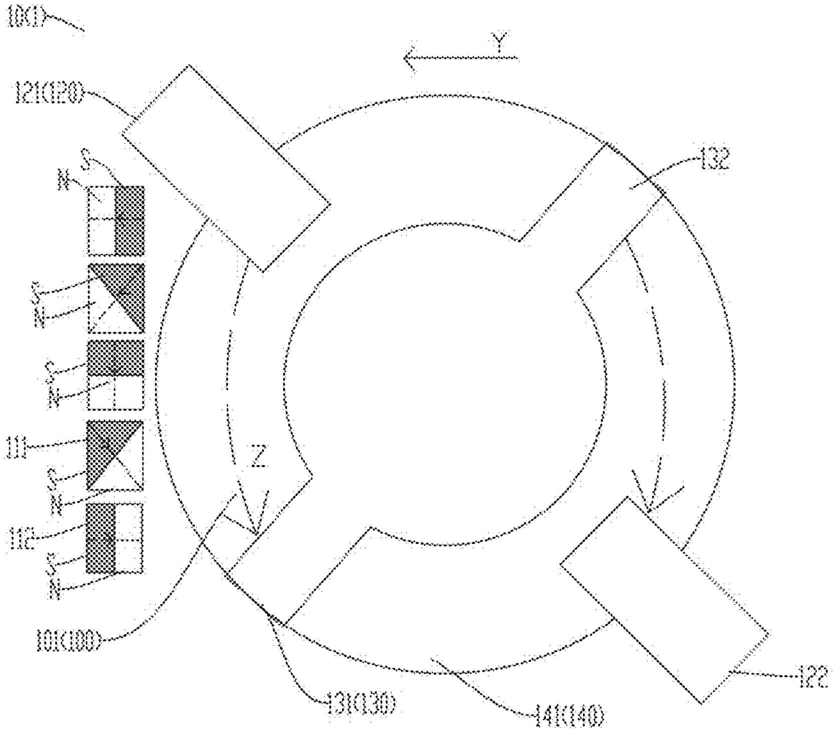
FIG. 23 is a schematic diagram of a switch according to Embodiment 7.
Figure 24:
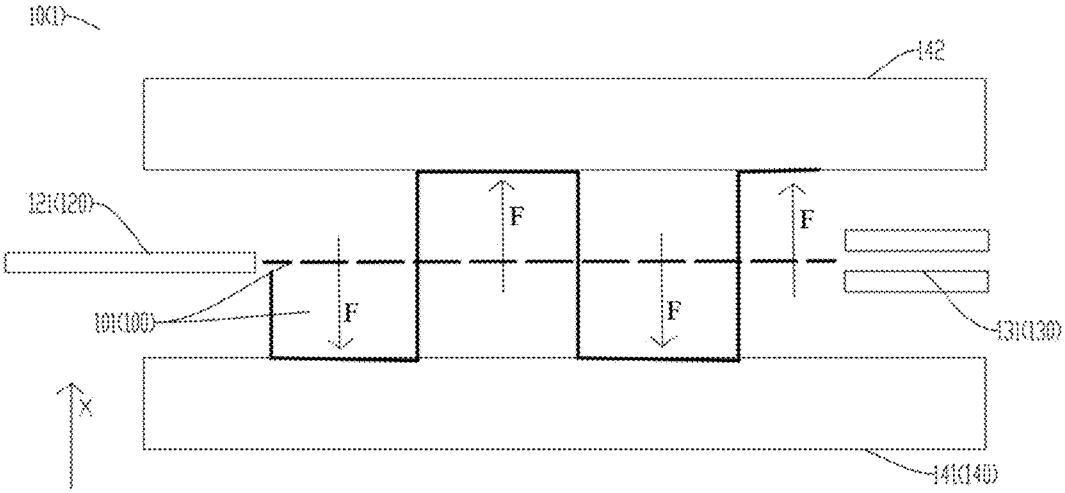
FIG. 24 is a schematic diagram illustrating that an electric arc moves under a magnetic field force according to Embodiment 7.

FIG. 23 is a schematic diagram of a switch 1 according to Embodiment 7. FIG. 24 is a schematic diagram illustrating that an electric arc 100 moves under a magnetic field force according to Embodiment 7. A difference between Embodiment 7 and Embodiment 1 is that a first magnet assembly 110 includes four or more magnets (as shown in FIG. 23). The four or more magnets include a first magnet 111 and a second magnet 112. The four or more magnets are sequentially arranged, and directions of magnetic induction lines of the magnets are sequentially different by a preset angle, so that a first electric arc 101 is approximately of a square wave shape to improve cooling effect on the first electric arc 101. The square wave shape of the first electric arc 101 in FIG. 23 is merely an example. By adjusting a quantity of magnets, a direction of a magnetic induction line of a magnet, or a preset angle difference between directions of magnetic induction lines of neighboring magnets, a shape of the first electric arc 101 is controlled, so that the first electric arc 101 adapts to a shape of an arc-extinguishing functional component 140 and moves onto a first sub-functional component 141 and a second sub-functional component 142 more quickly, improving cooling effect on the first electric arc 101.

Figure 25:
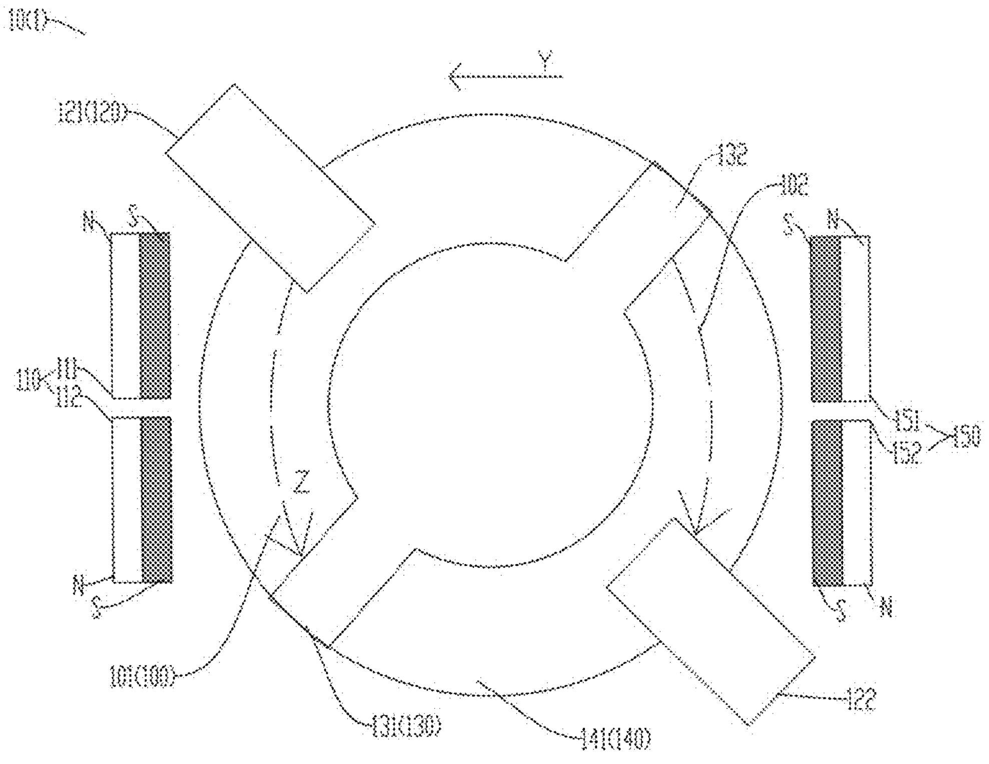
FIG. 25 is a schematic diagram of a switch according to Embodiment 8.

Embodiment 8 may provide a power supply system. A difference between Embodiment 8 and Embodiment 1 is that in this embodiment, a second magnet assembly 150 is different from a first magnet assembly 110, a first magnet 111 and a second magnet 112 are arranged in a same direction, a fourth magnet 151 and a fifth magnet 152 are arranged in a same direction, and the first magnet 111 and the fourth magnet 151 are arranged in opposite directions (as shown in FIG. 25). North poles N of the first magnet 111 and the second magnet 112 are both disposed close to a first electric arc 101 and south poles S of the first magnet 111 and the second magnet 112 are disposed far away from the first electric arc 101, and north poles N of the fourth magnet 151 and the fifth magnet 152 are both disposed close to a second electric arc 102 and south poles S of the fourth magnet 151 and the fifth magnet 152 are disposed far away from the second electric arc 102.

In an implementation, the first magnet 111 and the second magnet 112 in the first magnet assembly 110 are arranged in opposite directions, and the fourth magnet 151 and the fifth magnet 152 are arranged in a same direction.

In an implementation, the first magnet 111 and the second magnet 112 in the first magnet assembly 110 are arranged in opposite directions, the fourth magnet 151 and the fifth magnet 152 are arranged in opposite directions.

In an implementation, the first magnet assembly 110 includes the first magnet 111 and the second magnet 112 that are arranged in a same direction. The second magnet assembly 150 further includes a sixth magnet (not shown in the figure); and the fourth magnet 151, the fifth magnet 152, and the sixth magnet are arranged in a same direction.

In an implementation, a quantity magnets and arrangement direction of the magnets in the first magnet assembly 110 and the second magnet assembly 150 may be set as required.

Figure 26:
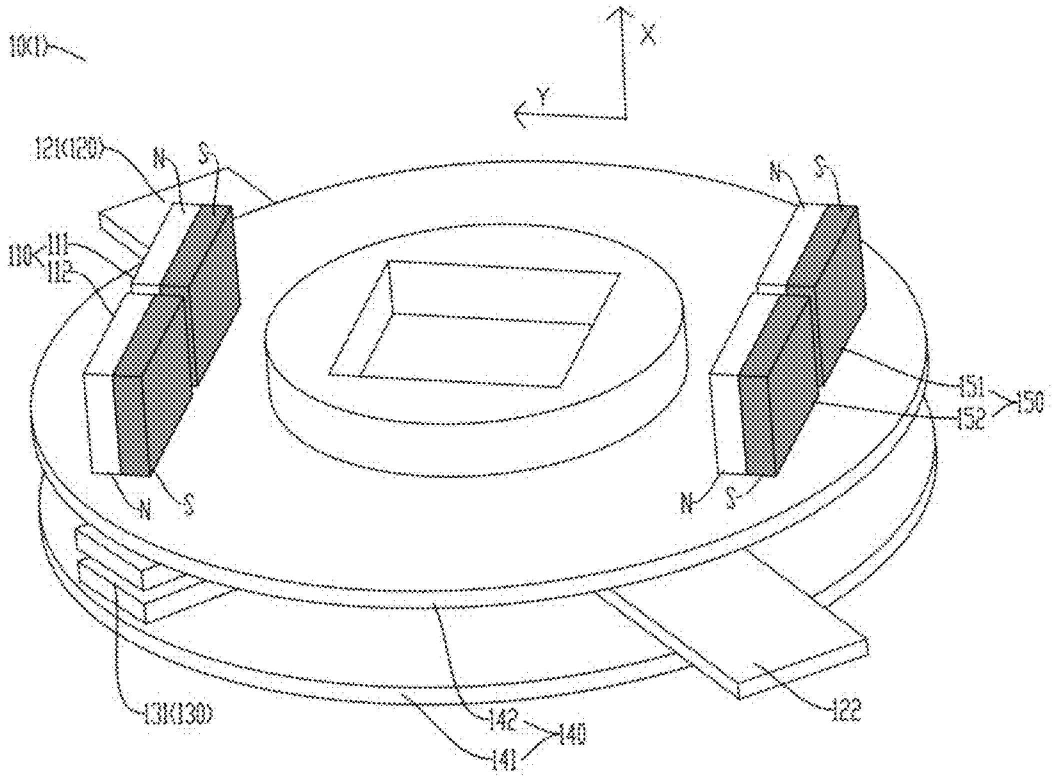
FIG. 26 is a schematic diagram of a switch according to Embodiment 9.
Figure 27:
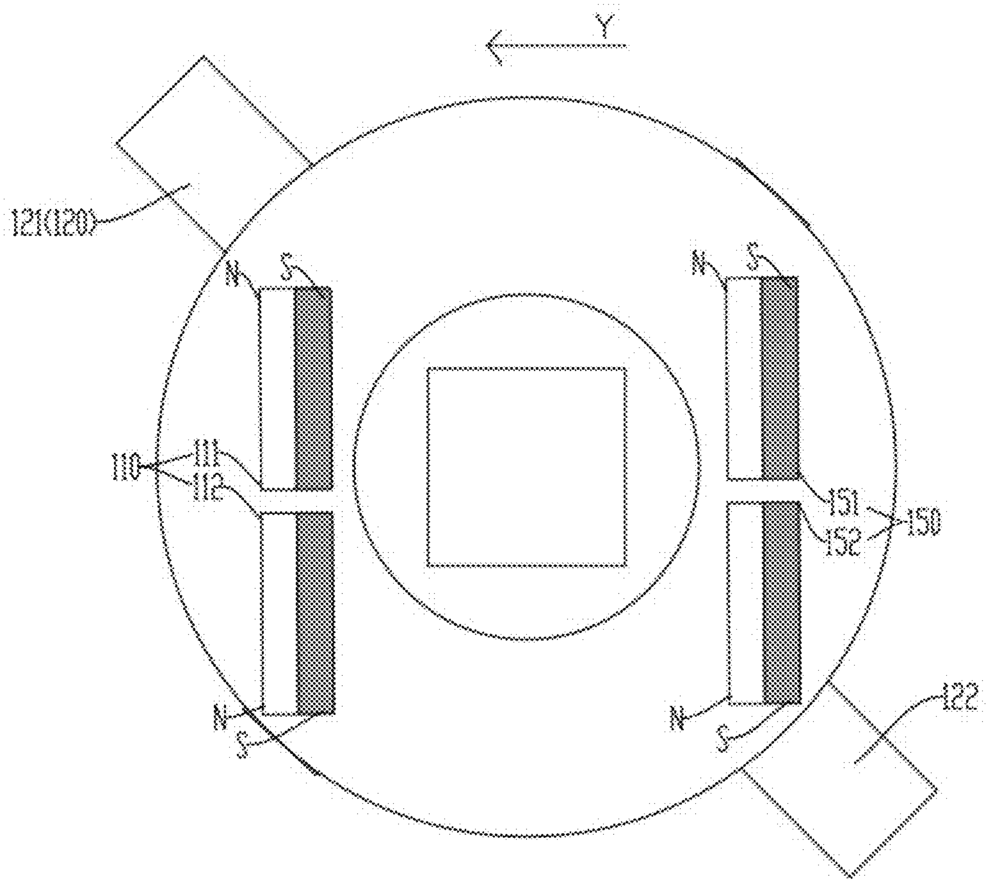
FIG. 27 is a top view of a switch according to Embodiment 9.

FIG. 26 is a schematic diagram of a switch 1 according to Embodiment 9. FIG. 27 is a top view of the switch 1 shown in FIG. 26. Embodiment 9 may provide a power supply system. A difference between Embodiment 9 and Embodiment 8 is that an arc-extinguishing functional component 140 includes a first sub-functional component 141 and a second sub-functional component 142 that are disposed opposite to each other, a first magnet assembly 110 and a second magnet assembly 150 are located on a side of the first sub-functional component 141 far away from the second sub-functional component 142, the first magnet assembly 110 is disposed close to a first fixed contact 121, and the second magnet assembly 150 is disposed close to a second fixed contact 122 to reduce a size of a switch unit 10.

In an implementation, the first magnet assembly 110 and the second magnet assembly 150 are fastened to the first sub-functional component 141. In an implementation, the first magnet assembly 110 and the second magnet assembly 150 may alternatively be located on a side of the second sub-functional component 142 far away from the first sub-functional component 141 along a first direction X, the first magnet assembly 110 is disposed closed to the first fixed contact 121, and the second magnet assembly 150 is disposed closed to the second fixed contact 122. In an implementation, one of the first magnet assembly 110 and the second magnet assembly 150 is located on a side of the first sub-functional component 141 far away from the second sub-functional component 142 along the first direction X, and the other one of the first magnet assembly 110 and the second magnet assembly 150 is located on a side of the second sub-functional component 142 far away from the first sub-functional component 141 along the first direction X. In an implementation, the first magnet assembly 110 is located on a side of the first sub-functional component 141 far away from the second sub-functional component 142, the first magnet assembly 110 is disposed close to the first fixed contact 121, and the second magnet assembly 150 is located on a side of the arc-extinguishing functional component 140 close to the second fixed contact 122 along a second direction X.

In this embodiment, magnetic field directions of magnets in the first magnet assembly 110 and the second magnet assembly 150 are the same as a radial direction of the first sub-functional component 141, in other words, the magnetic field directions of the magnets in the first magnet assembly 110 and the second magnet assembly 150 are coplanar with the first sub-functional component 141 or the second sub-functional component 142.

Figure 28:
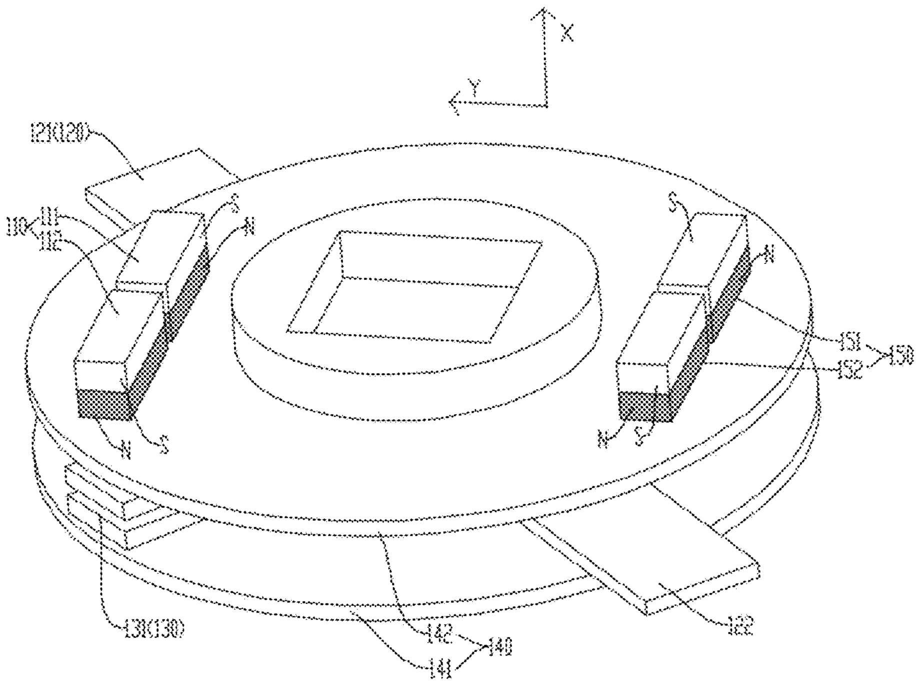
FIG. 28 is a schematic diagram of a switch according to Embodiment 10.

FIG. 28 is a schematic diagram of a switch 1 according to Embodiment 10. A difference between this embodiment and Embodiment 9 is that magnetic field directions of magnets in a first magnet assembly 110 and a second magnet assembly 150 are perpendicular to a first sub-functional component 141 or a second sub-functional component 142.

Figure 29:
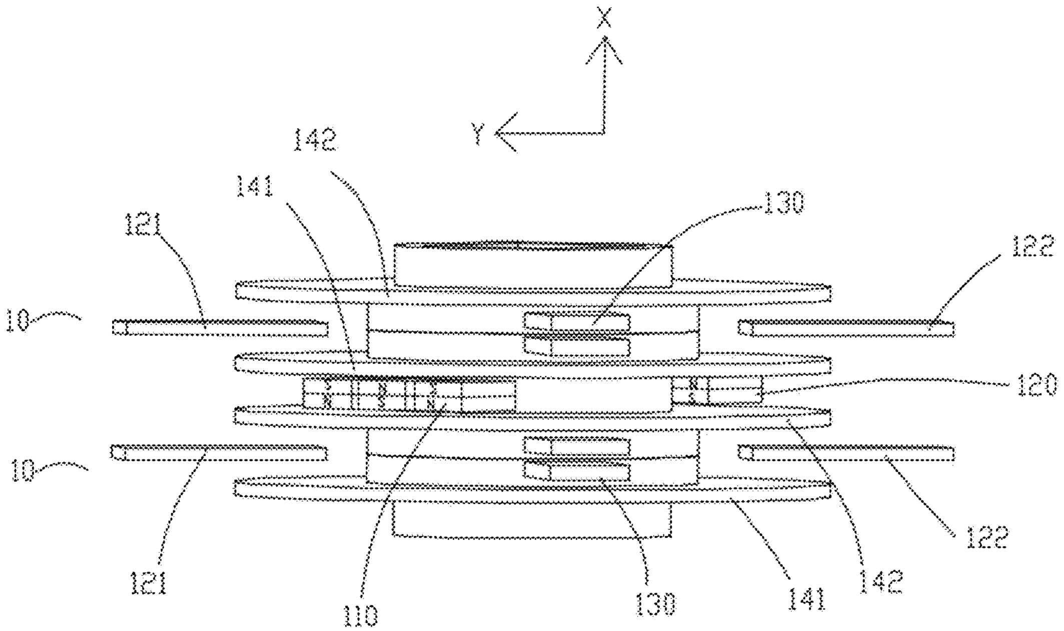
FIG. 29 is a side view of a switch according to Embodiment 11.

FIG. 29 is a side view of a switch 1 according to Embodiment 11. Embodiment 11 may provide a power supply system. A difference between Embodiment 10 and Embodiment 9 is that magnetic field directions of magnets in a first magnet assembly 110 and a second magnet assembly 150 are perpendicular to surfaces of a first sub-functional component 141 and a second sub-functional component 142, in other words, the magnetic field directions of the magnets in the first magnet assembly 110 and the second magnet assembly 150 are perpendicular to a radial direction of the first sub-functional component 141. In this embodiment, the switch 1 includes a plurality of switch units 10. The first magnet assembly 110 and the second magnet assembly 150 are distributed between two neighboring switch units 10. Two switch units 10 share a set of first magnet assembly 110 and second magnet assembly 150, so that a quantity of magnets can be reduced, thereby reducing costs.

In some implementations, the magnetic field directions of the magnets in the first magnet assembly 110 and the second magnet assembly 150 may be opposite or the same; or magnetic field directions of some magnets are opposite, and magnetic field directions of some other magnets are the same. This may be set as required. A quantity of magnets in the first magnet assembly 110 and the second magnet assembly 150 may also be set as required.

In some implementations, magnetic field directions of magnets in the first magnet assembly 110 and the second magnet assembly 150 may intersect. This may be set as required.

It should be noted that the magnets in the first magnet assembly 110 and the second magnet assembly 150 may be permanent magnets or soft magnets, may be magnets or magnets doped with metal atoms such as cobalt and nickel, or may be other magnets that can generate magnetic fields and have magnetic induction lines.

Embodiment 10 may provide a switch unit 10. The switch unit 10 is applied to a switch 1. The switch 1 includes: a knob 12, the switch unit 10, and an operating mechanism 11 connected between the knob 12 and the switch unit 10. The knob 12 is configured to control the switch unit to be opened or closed by using the operating mechanism 11. The switch unit 10 includes: an arc-extinguishing functional component 140, a fixed contact assembly 120, a moving contact 130, and a first magnet assembly 110. The fixed contact assembly 120 is located inside the arc-extinguishing functional component 140. The moving contact 130 is located inside the arc-extinguishing functional component 140 and is configured to move relative to the fixed contact assembly 120. The moving contact 130 is connected to the fixed contact assembly 120 when the switch unit 10 is closed. The moving contact 130 is separated from the fixed contact assembly 120 when the switch unit 10 is opened. An electric arc 100 is formed between the moving contact 130 and the fixed contact assembly 120 in a separation process. Directions of at least some magnetic induction lines of the first magnet assembly 110 intersect a current direction of the electric arc 100 to drive the electric arc 100 to move towards the arc-extinguishing functional component 140. The first magnet assembly 110 includes a first magnet 111 and a second magnet 112 that are spaced apart. The first magnet 111 and the second magnet 112 are both configured to increase a movement path of the electric arc 100 and increase a contact area between the electric arc 100 and the arc-extinguishing functional component 140, improving cooling effect of the arc-extinguishing functional component 140 on the electric arc 100. In this embodiment, the knob 12 of the switch 1 may be manually rotated, so that the knob 12 controls, by using the operating mechanism 11, the switch unit 10 to be opened or closed.

The descriptions and deformation solutions of the arc-extinguishing functional component 140, the fixed contact assembly 120, the moving contact 130, and the first magnet assembly 110 in the power supply system in the foregoing embodiments are applicable to the arc-extinguishing functional component 140, the fixed contact assembly 120, the moving contact 130, and the first magnet assembly 110 in the switch unit 10 in this embodiment. The description and the deformation solution of the position relationship between the first magnet assembly 110 and the arc-extinguishing functional component 140 in the power supply system are applicable to the position relationship between the first magnet assembly 110 and the arc-extinguishing functional component 140 in the switch unit 10 in this embodiment. Details are not described herein again.

The foregoing describes in detail the power supply system and the switch unit that are provided in the embodiments. In the embodiments, examples are used to describe the principles and embodiments. The descriptions in the foregoing embodiments are merely used to help understand the method. In addition, a person of ordinary skill in the art may make modifications in an embodiment without going beyond the scope of the embodiments.

What is claimed is:

1. A power supply system, comprising a control unit, a switch, a direct current source, and a power conversion unit, wherein the switch is electrically connected between the direct current source and the power conversion unit, the control unit is configured to send a switch-off signal to the switch when the direct current source or the power conversion unit is faulty, the switch comprises a switch unit and an operating mechanism, the operating mechanism is configured to receive the switch-off signal and control the switch unit to be opened or closed, and the switch unit comprises:

an arc-extinguishing functional component;

a fixed contact assembly, located inside the arc-extinguishing functional component;

a moving contact, located inside the arc-extinguishing functional component and configured to move relative to the fixed contact assembly, wherein the operating mechanism controls the switch unit to be opened when receiving the switch-off signal, so that the moving contact is separated from the fixed contact assembly, and an electric arc is formed between the moving contact and the fixed contact assembly in a separation process; and a first magnet assembly, wherein directions of at least some magnetic induction lines of the first magnet assembly intersect a current direction of the electric arc to drive the electric arc to move towards the arc-extinguishing functional component, the first magnet assembly comprises a first magnet and a second magnet that are spaced apart, and the first magnet and the second magnet are both configured to increase a movement path of the electric arc or increase a contact area between the electric arc and the arc-extinguishing functional component to improve cooling effect of the arc-extinguishing functional component on the electric arc.

2. The power supply system according to claim 1, wherein the fixed contact assembly comprises a first fixed contact and a second fixed contact that are spaced apart; the moving contact comprises a first terminal and a second terminal that are disposed opposite to each other; the operating mechanism is configured to control the moving contact to rotate; when the switch unit is closed, the first terminal and the second terminal are respectively connected to the first fixed contact and the second fixed contact to conduct a current; when the switch unit is opened, the moving contact is rotated to separate the first terminal from the first fixed contact and separate the second terminal from the second fixed contact, to cut off the current and form a first electric arc between the first terminal and the first fixed contact; the first magnet and the second magnet are located on one side of the first electric arc; and the first magnet and the second magnet are both configured to increase a movement path of the first electric arc and increase a contact area between the first electric arc and the arc-extinguishing functional component.

3. The power supply system according to claim 2, wherein the first magnet and the second magnet are arranged in a same direction to drive the first electric arc to move towards a same side of the arc-extinguishing functional component, increase the movement path of the first electric arc, and increase the contact area between the first electric arc and the arc-extinguishing functional component.

4. The power supply system according to claim 3, wherein the first magnet assembly further comprises:

a third magnet; and the first magnet, the second magnet, and the third magnet are all arranged in a same direction to drive the first electric arc to move towards a same side of the arc-extinguishing functional component, increase the movement path of the first electric arc, and increase the contact area between the first electric arc and the arc-extinguishing functional component.

5. The power supply system according to claim 2, wherein the arc-extinguishing functional component further comprises:

a first sub-functional component and a second sub-functional component that are disposed opposite to each other, the first magnet and the second magnet are arranged in opposite directions, the first magnet is configured to drive a part of the first electric arc to move towards the first sub-functional component, the second magnet is configured to drive a part of the first electric arc to move towards the second sub-functional component, to increase the movement path of the first electric arc, the first magnet is configured to increase a contact area between the first electric arc and the first sub-functional component, and the second magnet is configured to increase a contact area between the first electric arc and the second sub-functional component, so that the first sub-functional component and the second sub-functional component are both configured to cool the first electric arc.

6. The power supply system according to claim 5, wherein the first magnet assembly further comprises:

a third magnet; the first magnet, the second magnet, and the third magnet are sequentially arranged; the third magnet and the second magnet are arranged in opposite directions; the third magnet is configured to drive a part of the first electric arc to move towards the first sub-functional component, to increase the movement path of the first electric arc; and the third magnet is configured to increase the contact area between the first electric arc and the first sub-functional component, to improve cooling effect of the first sub-functional component on the first electric arc.

7. The power supply system according to claim 5, wherein the first magnet assembly further comprises:

a third magnet; the first magnet, the second magnet, and the third magnet are sequentially arranged; the second magnet and the third magnet are arranged in a same direction; the third magnet is configured to drive a part of the first electric arc to move towards the second sub-functional component, to increase the movement path of the first electric arc; and the third magnet is configured to increase the contact area between the first electric arc and the second sub-functional component, to improve cooling effect of the second sub-functional component on the first electric arc.

8. The power supply system according to claim 5, wherein the first magnet assembly further comprises:

a third magnet; the third magnet is located between the first magnet and the second magnet; the third magnet and the first magnet are arranged in a same direction; the third magnet is configured to drive a part of the first electric arc to move towards the first sub-functional component, to increase the movement path of the first electric arc; and the third magnet is configured to increase the contact area between the first electric arc and the first sub-functional component, to improve cooling effect of the first sub-functional component on the first electric arc.

9. The power supply system according to claim 2, wherein an extension direction of the first magnet intersects an extension direction of the second magnet, so that the first magnet assembly drives the first electric arc at a larger force and a volume of the switch is reduced.

10. The power supply system according to claim 2, wherein an extension direction of the first magnet is a same direction as an extension direction of the second magnet, and a direction of a magnetic induction line inside the first magnet intersects a direction of a magnetic induction line inside the second magnet, so that the first electric arc is in close contact with the arc-extinguishing functional component.

11. The power supply system according to claim 2, wherein the first magnet assembly further comprises:

four or more magnets, the four or more magnets comprise the first magnet and the second magnet, the four or more magnets are sequentially arranged, and directions of magnetic induction lines of the magnets are sequentially different by a preset angle to improve cooling effect on the first electric arc.

12. The power supply system according to claim 2, wherein the switch unit further comprises:

a second magnet assembly; when the switch unit is opened, a second electric arc is formed between the second terminal and the second fixed contact; the first magnet and the second magnet are located on a side of the first electric arc far away from the second electric arc; and directions of at least some magnetic induction lines of the second magnet assembly interact a current direction of the second electric arc to drive the second electric arc to move; and the second magnet assembly further comprises a fourth magnet and a fifth magnet that are spaced apart, the fourth magnet and the fifth magnet are located on a side of the second electric arc far away from the first electric arc, and the fourth magnet and the fifth magnet are both configured to increase a movement path of the second electric arc and increase a contact area between the second electric arc and the arc-extinguishing functional component, to cool the second electric arc, improve cooling effect on the second electric arc, and further improve a switch-off capability of the switch unit.

13. The power supply system according to claim 12, wherein the first magnet assembly and the second magnet assembly are located on two sides of the arc-extinguishing functional component along a radial direction of the arc-extinguishing functional component, the first magnet assembly is disposed close to the first fixed contact to improve cooling effect on the first electric arc, and the second magnet assembly is disposed close to the second fixed contact to improve cooling effect on the second electric arc.

14. The power supply system according to claim 12, wherein the arc-extinguishing functional component further comprises:

the first sub-functional component and the second sub-functional component that are disposed opposite to each other, the first magnet assembly and the second magnet assembly are located on a side of the first sub-functional component far away from the second sub-functional component, the first magnet assembly is disposed close to the first fixed contact, and the second magnet assembly is disposed close to the second fixed contact to reduce a size of the switch unit.

15. The power supply system according to claim 1, wherein the arc-extinguishing functional component further comprises:

at least one of an insulation enclosure or a metal grid group.

16. A switch unit, wherein the switch unit is applied to a switch, the switch comprises a knob, the switch unit, and an operating mechanism connected between the knob and the switch unit, the knob is configured to control, by using the operating mechanism, the switch unit to be opened or closed, and the switch unit comprises:

an arc-extinguishing functional component;

a fixed contact assembly, located inside the arc-extinguishing functional component;

a moving contact, located inside the arc-extinguishing functional component and configured to move relative to the fixed contact assembly, wherein the moving contact is connected to the fixed contact assembly when the switch unit is closed, the moving contact is separated from the fixed contact assembly when the switch unit is opened, and an electric arc is formed between the moving contact and the fixed contact assembly in a separation process; and a first magnet assembly, wherein directions of at least some magnetic induction lines of the first magnet assembly intersect a current direction of the electric arc to drive the electric arc to move towards the arc-extinguishing functional component, the first magnet assembly comprises a first magnet and a second magnet that are disposed at an interval, the first magnet and the second magnet are both configured to increase a movement path of the electric arc and increase a contact area between the electric arc and the arc-extinguishing functional component to improve cooling effect of the arc-extinguishing functional component on the electric arc.

17. The switch unit according to claim 16, wherein the fixed contact assembly further comprises:

a first fixed contact and a second fixed contact that are spaced apart; the moving contact comprises a first terminal and a second terminal that are disposed opposite to each other; the operating mechanism is configured to control the moving contact to rotate; when the switch unit is closed, the first terminal and the second terminal are respectively connected to the first fixed contact and the second fixed contact to conduct a current; when the switch unit is opened, the moving contact is rotated to separate the first terminal from the first fixed contact and separate the second terminal from the second fixed contact, to cut off the current and form a first electric arc between the first terminal and the first fixed contact; the first magnet and the second magnet are located on one side of the first electric arc; and the first magnet and the second magnet are both configured to increase a movement path of the first electric arc and increase a contact area between the first electric arc and the arc-extinguishing functional component.

18. The switch unit according to claim 17, wherein the first magnet and the second magnet are arranged in a same direction to drive the first electric arc to move towards a same side of the arc-extinguishing functional component, increase the movement path of the first electric arc, and increase the contact area between the first electric arc and the arc-extinguishing functional component, wherein the first magnet assembly further comprises a third magnet; and the first magnet, the second magnet, and the third magnet are all arranged in a same direction to drive the first electric arc to move towards a same side of the arc-extinguishing functional component, increase the movement path of the first electric arc, and increase the contact area between the first electric arc and the arc-extinguishing functional component.

19. The switch unit according to claim 17, wherein the arc-extinguishing functional component further comprises:

a first sub-functional component and a second sub-functional component that are disposed opposite to each other, the first magnet and the second magnet are arranged in opposite directions, the first magnet is configured to drive a part of the first electric arc to move towards the first sub-functional component, the second magnet is configured to drive a part of the first electric arc to move towards the second sub-functional component, to increase the movement path of the first electric arc, the first magnet is configured to increase a contact area between the first electric arc and the first sub-functional component, and the second magnet is configured to increase a contact area between the first electric arc and the second sub-functional component, so that the first sub-functional component and the second sub-functional component are both configured to cool the first electric arc.

20. The switch unit according to claim 19, wherein the first magnet assembly further comprises:

a third magnet; the first magnet, the second magnet, and the third magnet are sequentially arranged; the third magnet and the second magnet are arranged in opposite directions; the third magnet is configured to drive a part of the first electric arc to move towards the first sub-functional component, to increase the movement path of the first electric arc; and the third magnet is configured to increase the contact area between the first electric arc and the first sub-functional component, to improve cooling effect of the first sub-functional component on the first electric arc.

* * * * *